US011042275B2

United States Patent
Lewbel et al.

(10) Patent No.: US 11,042,275 B2
(45) Date of Patent: Jun. 22, 2021

(54) CALLING ATTENTION TO A SECTION OF SHARED DATA

(71) Applicant: MICROSOFT TECHNOLOGY LICENSING, LLC, Redmond, WA (US)

(72) Inventors: Hannah Rebecca Lewbel, Redmond, WA (US); Adam Michael Gleisner, Seattle, WA (US); Lindsey Nicole Conway, Seattle, WA (US); Clea Allington, Seattle, WA (US); Minu George, Bellevue, WA (US); Samantha Robbie Courts, Bellevue, WA (US); Margaret Arlene Grounds, Kirkland, WA (US); Scott H. W. Snyder, Seattle, WA (US); Nassr Victor Albahadly, Redmond, WA (US); Isabel Sophie Sharp, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/377,940

(22) Filed: Apr. 8, 2019

(65) Prior Publication Data

US 2020/0319778 A1  Oct. 8, 2020

(51) Int. Cl.
*G06F 3/0484*  (2013.01)
*G06F 3/0482*  (2013.01)
(Continued)

(52) U.S. Cl.
CPC ........ *G06F 3/04845* (2013.01); *G06F 3/0482* (2013.01); *H04L 65/1089* (2013.01); *H04L 65/601* (2013.01); *H04L 67/14* (2013.01)

(58) Field of Classification Search
CPC .... G06F 3/1423; G06F 3/0416; G06F 3/1454; G06F 3/04845; G06F 3/0482; H04L 67/14; H04L 65/1089; H04L 65/601
See application file for complete search history.

(56) References Cited

U.S. PATENT DOCUMENTS 8,099,458 B2 *  1/2012  Burtner, IV ........... G06Q 10/10
                                              709/204
10,126,927 B1    11/2018 Fieldman
(Continued)

FOREIGN PATENT DOCUMENTS

WO        2016100413 A1    6/2016

OTHER PUBLICATIONS

"International Search Report and Written Opinion Issued in PCT Application No. PCT/US2020/024350", dated Jun. 12, 2020, 11 Pages.

(Continued)

*Primary Examiner* — Anil K Bhargava
(74) *Attorney, Agent, or Firm* — Newport IP, LLC; Jacob P. Rohwer

(57) ABSTRACT

Technologies are disclosed that enable a computing system to provide a computationally efficient interface for collaborative viewing and/or editing of shared content. Individual users may separately edit (e.g., create, modify, etc.) content in a particular section (e.g., area, region, page, etc.) of a shared data unit such as a file. A result of this separate editing may cause sections of the shared data unit to be off-screen from a perspective of a user and/or a computing device being used by the user. The disclosed techniques provide an effective way for an individual user, of a multi-user sharing session, to request that other users view content being edited by the individual user in a section that is "off-screen" for the other users. Based on the request, a selectable user interface element can be displayed enabling (Continued)

efficient access to the content to be viewed by the other users.

10 Claims, 17 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 2003/0189598 A1* | 10/2003 | Lipstein | G06F 3/0481 715/781 |
| 2004/0025113 A1 | 2/2004 | Penke et al. | |
| 2006/0031235 A1 | 2/2006 | Foresti et al. | |
| 2006/0224430 A1 | 10/2006 | Butt | |
| 2009/0052645 A1 | 2/2009 | Bansal et al. | |
| 2009/0234721 A1 | 9/2009 | Bigelow et al. | |
| 2010/0251153 A1 | 9/2010 | Sangiovanni | |
| 2011/0078573 A1 | 3/2011 | Ooba | |
| 2011/0268262 A1 | 11/2011 | Jones et al. | |
| 2012/0254773 A1 | 10/2012 | Viswanathan | |
| 2013/0091440 A1 | 4/2013 | Kotler | |
| 2013/0191454 A1 | 7/2013 | Oliver et al. | |
| 2014/0012614 A1* | 1/2014 | Beresford-Wood | G06Q 40/12 705/7.15 |
| 2014/0082100 A1 | 3/2014 | Sammon et al. | |
| 2015/0002435 A1* | 1/2015 | Shimizu | G09G 5/12 345/173 |
| 2015/0213395 A1 | 7/2015 | Swanson et al. | |
| 2015/0341399 A1 | 11/2015 | Lee | |
| 2016/0085381 A1* | 3/2016 | Parker | G06F 3/1454 715/753 |
| 2016/0321227 A1* | 11/2016 | Keslin | G06F 40/197 |
| 2017/0090852 A1 | 3/2017 | Harada | |
| 2018/0039951 A1 | 2/2018 | Wynn et al. | |
| 2018/0060018 A1 | 3/2018 | Kunakhovich et al. | |
| 2019/0013955 A1 | 1/2019 | Yoo | |

OTHER PUBLICATIONS

"Non Final Office Action Issued in U.S. Appl. No. 16/660,744", dated Dec. 10, 2020, 11 Pages.

"International Search Report and the Written Opinion Issued in PCT Application No. PCT/US20/052988", dated Dec. 23, 2020, 12 Pages.

"International Search Report and the Written Opinion Issued in PCT Application No. PCT/US20/052989", dated Jan. 18, 2021, 17 Pages.

"International Search Report and Written Opinion Issued in PCT Application No. PCT/US20/052987", dated Mar. 10, 2021, 23 Pages.

"Non Final Office Action Issued in U.S. Appl. No. 16/660,678", dated Apr. 12, 2021, 16 Pages.

"Notice of Allowance Issued in U.S. Appl. No. 16/660,744", dated Apr. 14, 2021, 9 Pages.

\* cited by examiner

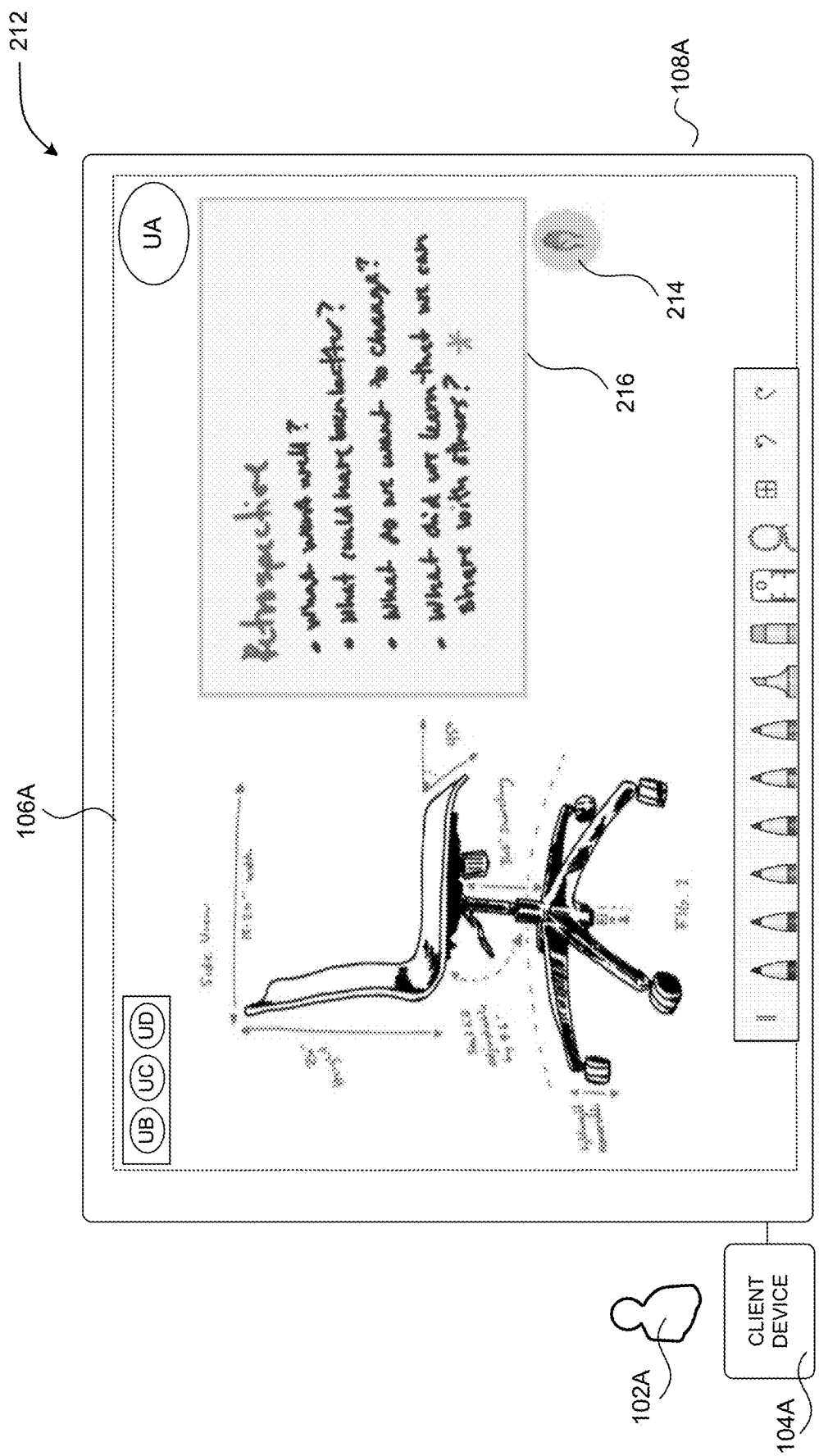

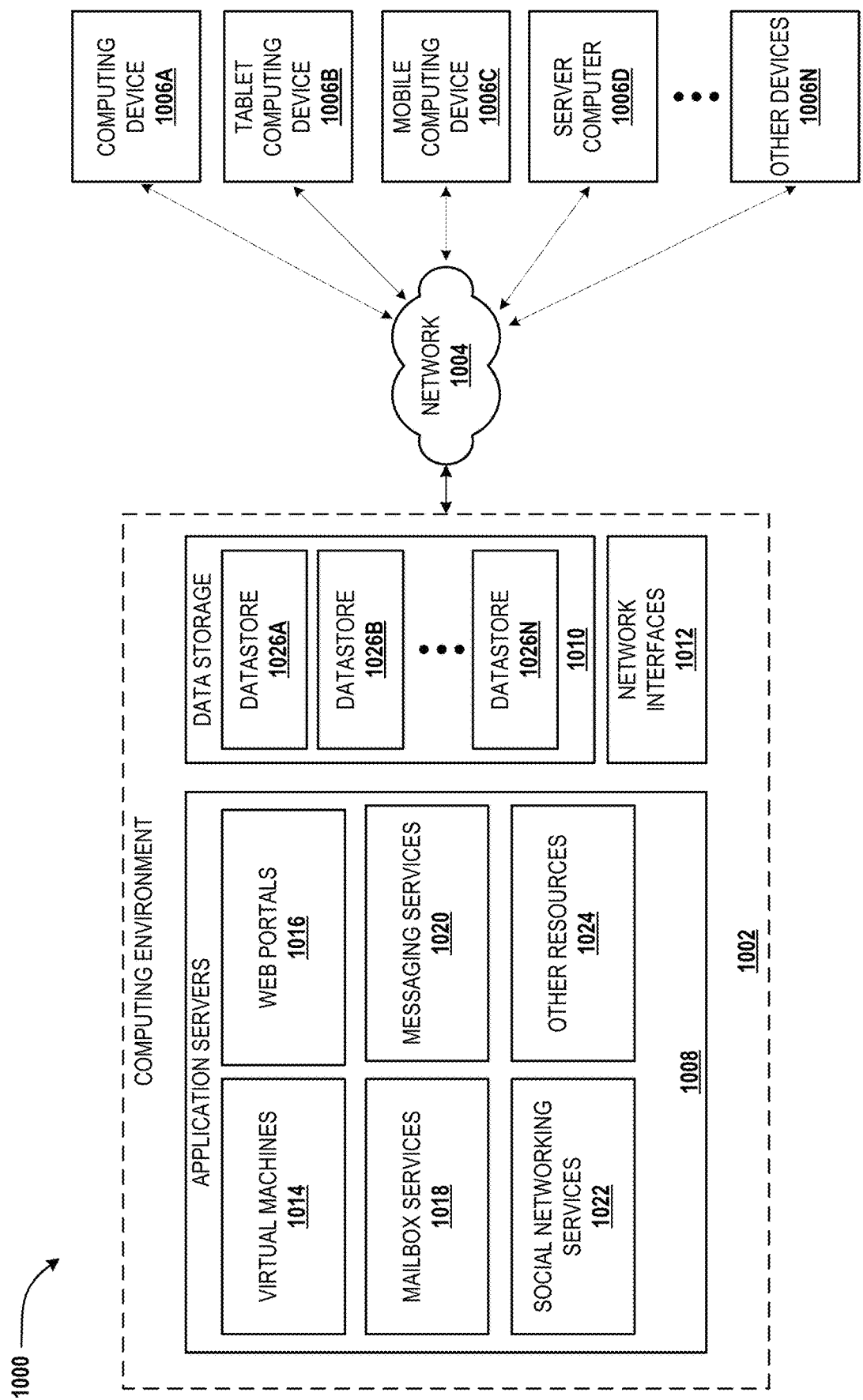

CALLING ATTENTION TO A SECTION OF SHARED DATA

BACKGROUND

Many productivity applications provide specialized tools for displaying and editing (e.g., creating, modifying, etc.) contents of a file. Some productivity applications allow multiple users to collaborate within a shared workspace created for business meetings, brainstorming sessions, classrooms, and so forth. Thus, these productivity applications provide an environment where multiple users can simultaneously view and/or edit the contents of a file as a group. For example, a productivity application can provide a digital whiteboard for multiple users to manipulate whiteboard objects on a digital canvas. The whiteboard objects can include digital ink expressions (e.g., drawing elements, text, diagrams, etc.), etc.

Although existing productivity applications can provide specialized functions that support group collaboration as it relates to editing content in a multi-user collaborative workspace, existing productivity applications fail to provide an effective way of coordinating group collaboration given a situation where users of the group break apart to work separately on different sections of shared data. For instance, in some scenarios, the users in the group may access the shared data using their own computing devices. Using their own computing devices, the users in the group may focus (e.g., zoom in) on separate sections of the shared data. This enables the users to independently edit content in their own section of the shared data. Consequently, a first user editing content in a first section is unlikely to be able to effectively monitor and/or keep an eye on content being edited by a second user in a second section that is not being displayed via the computing device of the first user. Stated another way, the second section is "off-screen" from the perspective of the first user and/or the computing device of the first user.

Therefore, productivity applications lack the ability to effectively coordinate when and/or where collaboration is needed and/or is wanted. For instance, continuing the example scenario from the previous paragraph, the second user may want the first user to review the content the second user has created and/or edited. Or the second user may want to ask the first user a question about the content being edited by the second user. To achieve this using existing systems, the second user would typically have to establish a separate form of communication with the first user (e.g., a textual "chat" message, a phone call, etc.) and manually guide the first user to her or his section in the shared data (e.g., "come to the upper right portion of the file", "flip to page seven of the file", etc.). The communication from the second user may often interrupt what the first user is doing. Alternatively, the first user could zoom out of her or his section and manually search, in an unguided manner, the shared data for the section being worked on by the second user. Such efforts are inefficient with respect to the consumption of time and/or computing resources.

SUMMARY

The techniques disclosed herein provide a computationally efficient human-computer interface for collaborative viewing and/or editing of content. Among other technical benefits, the techniques disclosed herein can reduce utilization of computing resources by simplifying the collaborative process for viewing and/or editing content in a multi-user collaborative workspace. As described herein, data can be shared amongst a number of users, each utilizing separate devices. Thus, the data may be referred to herein as a "shared" data (e.g., a data unit such as a file). Further, individual users may separately edit (e.g., create, modify, etc.) content in a particular section (e.g., area, region, page, etc.) of the shared data. A result of this separate editing may cause sections of the shared data to be off-screen from a perspective of a user and/or a computing device being used by the user.

The disclosed techniques provide an efficient and an effective way for an individual user, of a multi-user sharing session, to request that other users view content being edited by the individual user in a section that is "off-screen" for the other users. For example, one user may want to collaborate with another user about the content. In another example, one user may want to ask another user a question while both are simultaneously viewing the content. In yet another example, one user may want to let another user know they have completed an assigned group task and her or his completed work is ready for review (e.g., a second set of eyes).

As described herein, a request for a user to view content may be referred to as a call for attention to a section of shared data. Calling attention to a particular section of the shared data can be implemented in a graphical manner. For example, a user interface element can be displayed on a display screen being viewed by a user that has been requested to provide attention to a particular section being edited by another user. The user interface element can be displayed in a non-invasive way that does not interrupt the work being performed by the user. Moreover, the user interface element can continue to be displayed, over a period time, in order to make sure the user is aware that the other user has requested her or his attention. In various examples, the user interface element is selectable, and thus, the user interface element provides a mechanism for the user to efficiently switch a display screen to content which the user has been requested to view. This can be implemented at a time that is convenient to the user. Further, by graphically calling attention to a particular section of shared data, the need for a user to consume time and/or computing resources to manually search for and locate the content to view can be reduced or eliminated. This can reduce the utilization of computing resources like processor cycles, memory, network bandwidth, and power.

In order to provide the technical benefits described above, and potentially others, a system is provided that enables users to participate in a multi-user sharing session. The multi-user sharing session might, for example, be implemented in association with a digital whiteboard presenting whiteboard objects such as, but not limited to, handwriting or hand-drawn images such as digital ink created using a digital pen or touchscreen. Alternatively, the multi-user sharing session can also be implemented in association with other types of collaborative workspaces and other configurations.

Users can access a multi-user sharing session utilizing client computing devices configured with an appropriate client application. The client application can present content to the users such as, for example, on display devices (e.g., display screens) connected to the client computing devices. The content might be, for example, a digital whiteboard (e.g., a digital canvas), a word processing document, a spreadsheet document, a presentation document, an image or video, or another type of content. The content can be stored in a data unit, such as a file, on a server computer and distributed to the client computing devices participating in the multi-user sharing session.

The system can display different content of shared data on different client computing devices. The different content can then be edited by different users in different sections of the shared data. Different users can edit content at the same time in the multi-user sharing session. Alternatively, different users can edit content at different times in the multi-user sharing session. For instance, the multi-user sharing session can last for an extended period of time (e.g., days, weeks, months, etc.), and authorized users can access the shared data and/or edit content throughout this extended time period.

The system can receive, from a client computing device of a user that wants to call attention to the content she or he has created, a request for another user to view the content. For example, a user can select a menu option that implements a feature (e.g., functionality) enabling the user to request that the other user view the content being edited by the user. For instance, the feature essentially enables the user to graphically "raise a hand" in a multi-user sharing session to call attention to a particular section of a shared file. The request can be for all the other users in the multi-user sharing session to provide attention. In other words, the whole group is called upon to review the content. Alternatively, the request can identify individual users in the multi-user sharing session that are to provide attention. That is, the user can provide input specifying a particular person to review the content she or he has edited.

Responsive to receiving the request, the system can display a user interface element via the client computing device of a user that is requested to provide attention. The user interface element indicates that the user has been requested to view content being edited by another user in another section of the shared data (e.g., a section that is currently off-screen). Moreover, the user interface element is a selectable user interface element that provides an efficient manner for the user to initiate the viewing of the content on her or his display screen. For instance, upon selection of the user interface element by the user, the system can take the user to the section of the shared data for which attention has been requested. In various examples, the system changes a view from the user's own content being edited in her or his own section of the shared data to a view of the content of another section (e.g., the display jumps from one section of the shared data to another). In other examples, the system scrolls from one section in the shared data to another section to be viewed in at least one of a horizontal direction or a vertical direction. This enables the user to briefly view content that may exist between the two sections. The viewing of intermediate content may be useful in understanding the context of the shared file or a manner in which different sections of the shared data are organized (e.g., laid out) based on type(s) of content being edited and/or particular users editing the content.

In various examples, a user interface of a multi-user sharing session can include graphical representations of the different users that have authorized access to the shared data. The system can display the user interface element that indicates that a user has been requested to view content in a manner so that it is graphically associated with the user that requests the content be viewed. For instance, the user interface element can be graphically connected to a graphical representation of a user. Or, the user interface element can comprise an altered visual appearance of the graphical representation of a user. For example, a flashing graphical representation may be an indicator that attention is requested by the user, a change to a particular color of a graphical representation may be an indicator that attention is requested by the user, or an "attention requested" icon displayed as a partially transparent overlay on the graphical representation may be an indicator that attention is requested by the user. In this way, the user requested to provide attention knows which user is requesting attention. In some examples, a graphical representation of a user indicates whether the user is presently accessing the shared data and/or editing the content in her or his section of the shared data. Stated another way, the graphical representation can serve as a presence indicator.

In various examples, the system can access a layout of the shared data to determine a layout location of a section that contains content requested to be viewed relative to a layout location of a section currently being viewed by a user that has been requested to provide attention. Based on this determination, the system can display the user interface element at a position on a display screen that represents the layout location of the section that contains the content requested to be viewed relative to the layout location of the section currently being viewed. This provides spatial context related to a layout of the sections of the shared data.

In further examples, the system enables the user requesting attention to identify a portion of content in her or his section for other users to focus on. For example, the user can alter the visual appearance of the portion of the content (e.g., highlight, change a color, etc.). Consequently, when the system presents the content to the other users, the system can graphically distinguish a portion of the content to be focused on (e.g., for review purposes) from other portions of the content within an individual section.

In addition to those technical benefits discussed above, implementations of the disclosed technologies can result in improved human-computer interaction during a multi-user sharing session and/or the editing of content in shared data. This can save computing resources, such as memory resources, processing resources, and networking resources. Other technical benefits not specifically mentioned herein can also be realized through implementations of the disclosed subject matter.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2C illustrates an example of how a user can identify a portion of content in her or his section for other users to focus on.

FIG. 10 is a diagram illustrating a distributed computing environment capable of implementing aspects of the techniques and technologies presented herein.

DETAILED DESCRIPTION

The Detailed Description discloses aspects of a system that provides a computationally efficient interface for collaborative viewing and/or editing of content. As discussed briefly above, individual users may separately edit (e.g., create, modify, etc.) content in a particular section (e.g., area, region, page, etc.) of shared data. A result of this separate editing may cause sections of the shared data to be off-screen from a perspective of a user and/or a computing device being used by the user. The disclosed techniques provide an effective way for an individual user, of a multi-user sharing session, to request that other users view content being edited by the individual user in a section that is "off-screen" for the other users. Based on the request, a selectable user interface element can be displayed enabling efficient access to the content to be viewed by the other users.

Figure 1A:
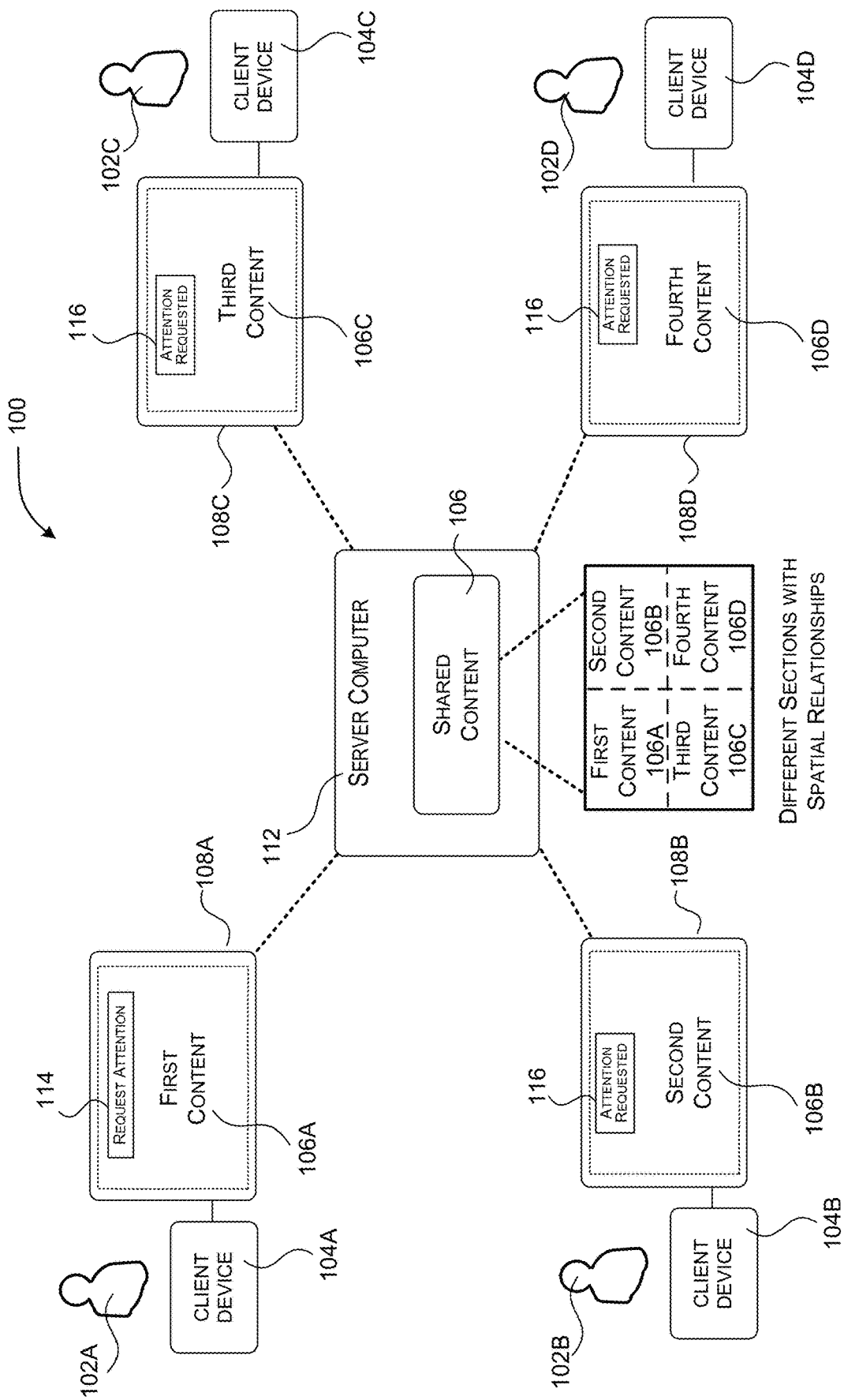
FIG. 1A illustrates a block diagram of a system for providing a computationally efficient human-computer interface for calling other users' attention to content.

FIG. 1A is a block diagram of a system for providing a computationally efficient human-computer interface for calling other users' attention to content. The exemplary system shown in FIG. 1A can provide a collaborative whiteboard where multiple users can view and/or edit (e.g., work on) separate sections of content in shared data during a multi-user sharing session. As illustrated in FIG. 1A, a system 100 is configured to enable users 102A-102D (which might be referred to collectively as the "users 102" or individually as a "user 102") to participate in a multi-user sharing session. Note that while four users 102A-102D are shown in FIG. 1A, a multi-user sharing session may include any number of users (e.g., two, three, five, ten, one hundred, etc.).

The multi-user sharing session might, for example, be implemented as a digital whiteboard presenting whiteboard objects such as, but not limited to, handwriting or hand-drawn images such as digital ink created using a digital pen or touchscreen. It is to be appreciated that the technologies disclosed herein can be utilized with any type of collaborative platform such as, but not limited to, collaborative whiteboards and collaborative editing sessions of documents such as a spreadsheet, word processing document, etc. Accordingly, the configurations described herein are not limited to use with a specific collaboration platform.

The users 102A-102D can access the multi-user sharing session utilizing client computing devices 104A-104D (which might be referred to collectively as the "computing devices 104" or individually as a "computing device 104"), respectively configured with an appropriate client application. The client application can present different content 106A-106D to the different users 102A-102D such as, for example, on display devices 108A-108D (e.g., display screens) connected to the client computing devices 104A-104D, respectively. The different content 106A-106D, in combination, makes up the content 106 of shared data such as a file. In some instances, a subset of the users 102A-102D may be concurrently viewing and working on the same piece of content and/or in the same section or overlapping sections.

As described above, the content 106 may include, for example, a digital whiteboard, virtual objects, a word processing document, a spreadsheet document, a presentation document, an image or a video, or another type of content. In examples further described herein, the content 106 includes a digital whiteboard (e.g., a digital canvas) containing hand drawn diagrams and text.

The content 106 can be stored in a shared data unit such as a file on a server computer 112, or in another networked location, and distributed to the client computing devices 104 participating in the multi-user sharing session via a communications network. The shared data unit containing the content 106 might also be stored on one of the client computing devices 104 and shared to the other client computing devices 104 in other configurations. The content 106 can be provided to the client computing devices 104 in other ways in other configurations.

As described above, the users 102A-102D may separately edit (e.g., create, modify, etc.) the content 106 via different sections (e.g., areas, regions, pages, etc.) of the shared data unit. To this end, user 102A is shown editing first content 106A contained in a first section of the shared data unit. User 102B is shown editing second content 106B contained in a second section of the shared data unit. User 102C is shown editing third content 106C contained in a third section of the shared data unit. And user 102D is shown editing fourth content 106D contained in a fourth section of the shared data unit.

Figure 1B:
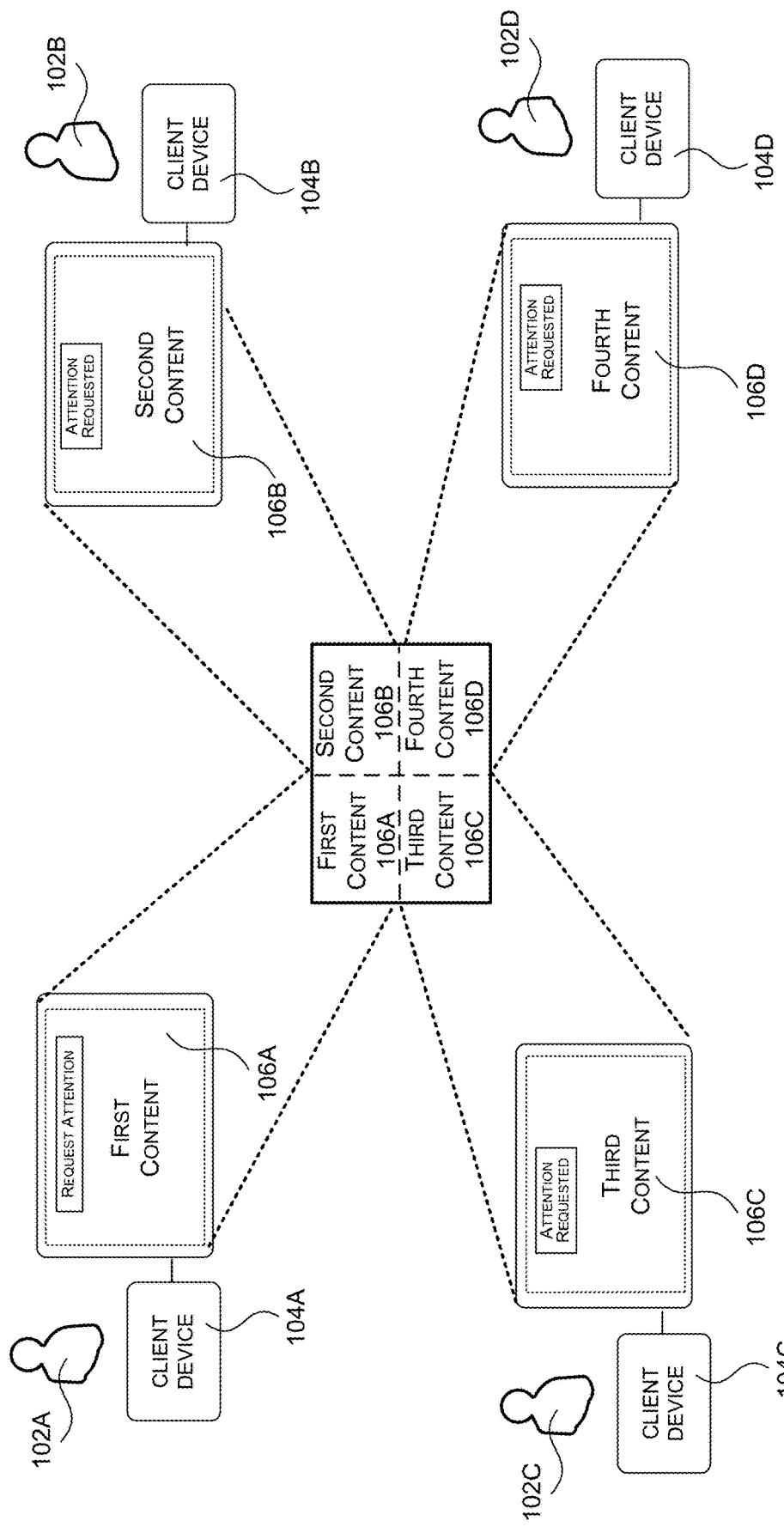
FIG. 1B illustrates how different portions of the content in FIG. 1A are displayed on different display screens of the different client computing devices for the users.

The different sections of the shared data unit may be configured in a layout that defines spatial relationships between the sections, as shown in FIG. 1A. For example, the spatial relationship may define a location of one section relative to a location of another section in the layout. The spatial relationship can be defined using a coordinate space in which the content of the file is laid out. In one example, the coordinate space comprises a two-dimensional "x-y" coordinate space, and thus, the spatial relationship may comprise a horizontal and/or a vertical component. In other examples, the coordinate space can be different, such as a three-dimensional coordinate space, and thus, a spatial relationship may include additional components for additional dimensions. As an additional reference, FIG. 1B illustrates how different portions of the content in FIG. 1A are displayed on different display screens of the different client computing devices for the users. More specifically, FIG. 1B shows the mappings of different content to different display screens.

While FIG. 1A and FIG. 1B illustrate evenly sized and evenly shaped sections that are adjacent to one another and share boundaries, it is understood that the techniques described herein can be implemented in association with sections of different sizes, sections of different shapes, and/or sections that do not share boundaries in the shared file. Moreover, in some instances, sections can partially overlap one another. Thus, there is no limitation as to how a section is defined and there is no limitation on the number of sections in a shared data unit (e.g., there may be one hundred people collaborating on a whiteboard-based project, each working within their own section of an expansive digital canvas). Rather, the use of "section" herein is employed to highlight that different content of a same data unit can be displayed on different display screens. In one example, the sections may be defined based on a portion of a shared data unit currently being displayed on a display screen of a client computing device. In an additional example, one section may be a grid section with a pre-configured size and shape, while another section of the shared data unit may be a free-form section outlined based on user input.

A result of this separate editing may cause different content and/or different sections of the shared data unit to be off-screen from a perspective of a user and/or a computing device being used by the user. Consequently, the disclosed techniques provide an efficient and an effective way for an individual user, of a multi-user sharing session, to request that other users view content being edited by the individual user in a section that is "off-screen" for the other users. For example, one user may want to collaborate with another user about the content. In another example, one user may want to ask another user a question while both are simultaneously viewing the content. In yet another example, one user may want to let another user know they have completed an assigned group task and her or his completed work is ready for review (e.g., a second set of eyes).

To further illustrate, FIG. 1A shows that the client application includes a feature to request attention, as shown on the display screen 108A. To implement the feature, user 102A selects a menu option 114 via the client computing device 104A. Based on selection of the menu option 114, the client computing device 104A sends, and the server computer 112 receives, a request for other users (e.g., user 102B, user 102C, and/or user 102D) to view the first content 106A. In other words, the request calls attention to the first content 106A on behalf of the first user 102A.

Upon receiving the request, the server computer 112 causes a user interface element 116, indicating that attention is requested, to be displayed on each of the display screens 108B, 108C, and/or 108D. That is, the server computer 112 can generate and send information (e.g., a notification) to enable the client computing devices to display the user interface element 116.

The user interface element 116 can be displayed in a non-invasive way that does not interrupt the work being performed by the users 102B, 102C, 102D. For example, the user interface element 116 can be displayed at an edge of a user interface. Moreover, the user interface element 116 can continue to be displayed, over a period time, in order to make sure the users 102B, 102C, 102D are aware that user 102A has requested that they view the first content 106A.

In various examples, the user interface element 116 is selectable, and thus, the user interface element 116 provides a mechanism for the users 102B, 102C, 102D to efficiently switch their display screens 108B, 108C, 108D from respectively displaying the second content 106B, the third content 106C, and the fourth content 106D, to displaying the first content 106A for which user 102A has requested attention. This can be implemented at a time that is convenient to each of users 102B, 102C, 102D.

Figure 1C:
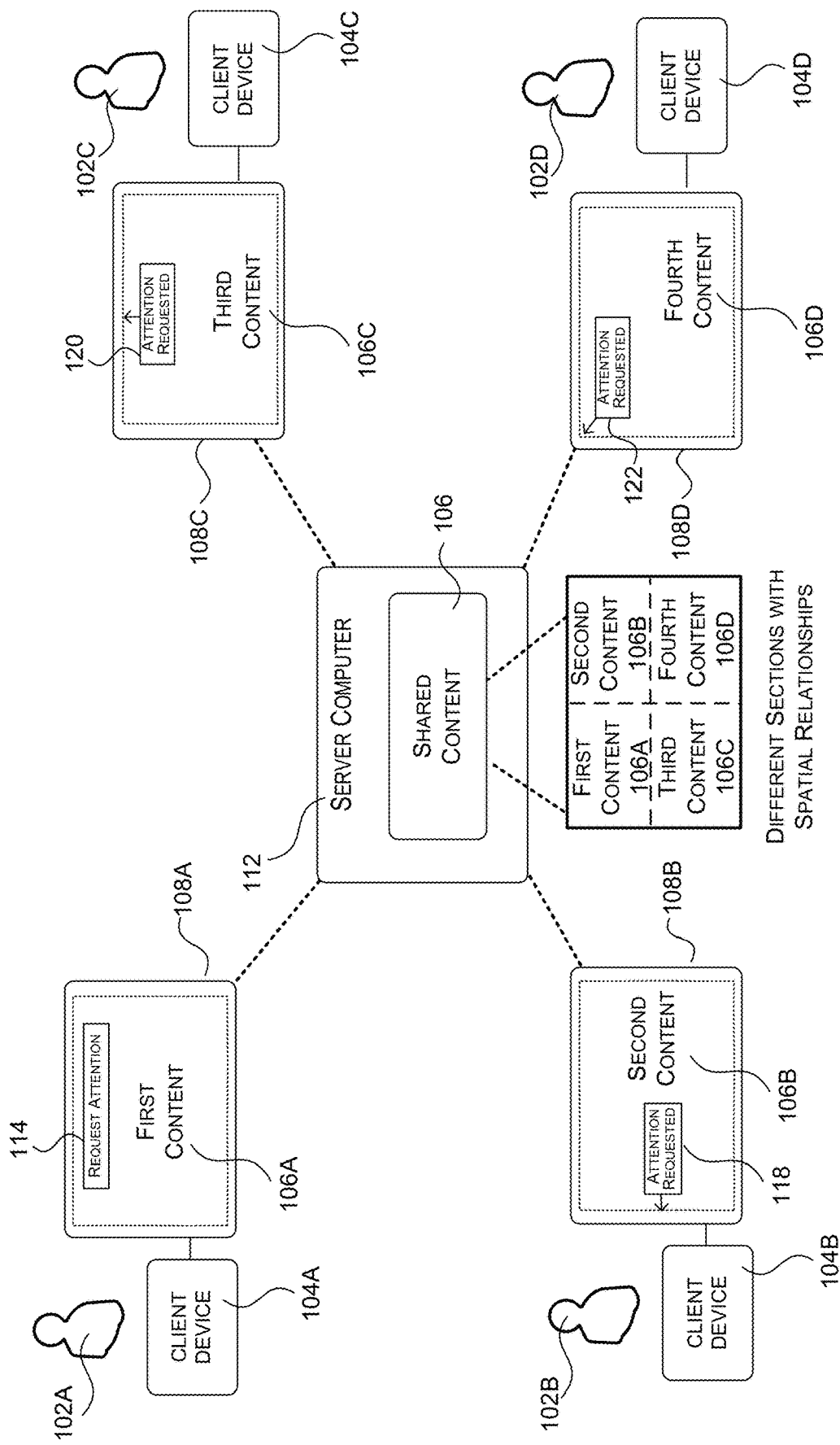
FIG. 1C illustrates how some of the computing devices of the system shown in FIG. 1A can provide a user interface through which a user interface element can be positioned to represent a location of another section of content to view based on a call for attention.

FIG. 1C shows how some of the computing devices of the system shown in FIG. 1A can provide a user interface through which the user interface element 116 (from FIG. 1A) can be positioned to represent a location of another section of content to view based on a call for attention. For example, the server computer 112, or another computing device operating as a part of the disclosed system 100, can access a layout of the shared data unit to determine a layout location of a section that contains content 106A requested to be viewed relative to a layout location of a section currently being viewed by a user 102B, 102C, 102D that has been requested to provide attention. Based on this determination, the server computer 112, or the other computing device, can display the user interface element 116 at a position, within a user interface, that represents the layout location of the section that contains the content 106A requested to be viewed relative to the layout location of the section currently being viewed. This provides, to a user, spatial context related to a layout of the shared data unit.

As shown in FIG. 1C, user interface element 118 is positioned at the left side of a user interface on display screen 108B as a result of the layout revealing that the first content 106A of the first section is directly to the left of the second content 106B currently being displayed via the user interface on the display screen 108B. Further, user interface element 120 is positioned at the top of a user interface on display screen 108C as a result of the layout revealing that the first content 106A of the first section is directly above the third content 106C currently being displayed via the user interface on the display screen 108C. And user interface element 122 is positioned at the upper left corner of the user interface on display screen 108D as a result of the layout revealing that the first content 106A of the first section is up and to the left of the fourth content 106D currently being displayed via the user interface on the display screen 108D.

Figure 2A:
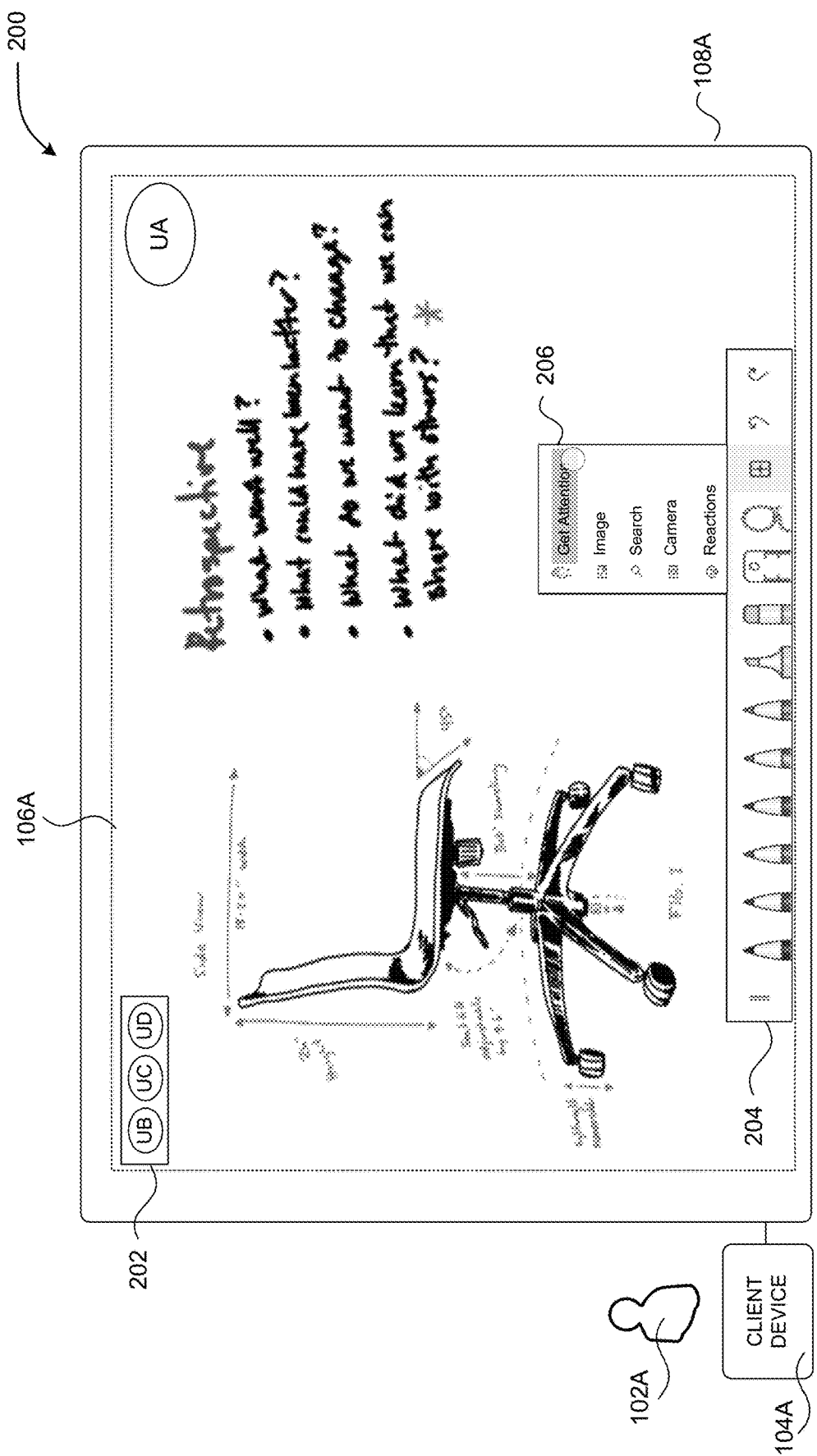
FIG. 2A illustrates an example of how a user can access and select a menu option in a user interface to request that other users of a multi-user sharing session view content being edited by the user.

FIGS. 2A-2D show how a computing device of the system can provide user interface(s) through which a user can request that other users view content being edited, or that has been edited, by the user. In the example of FIG. 2A, a user accesses and selects a menu option in a user interface 200 to request that other users of a multi-user sharing session view content being edited by the user.

As shown in FIG. 2A, user 102A employs a digital whiteboard application executing via client computing device 104A to edit content on a section of a digital canvas, access to which is shared amongst a plurality of users. Content being edited by user 102A includes a drawing of a chair and dimensions associated with a chair, as well as a hand-written list of questions. The user interface includes graphical representations 202 of other users (e.g., user 102B or "UB", user 102C or "UC", user 102D or "UD") that have authorized access to the digital canvas.

In various examples, a visual appearance of a graphical representation 202 of a user can be altered to indicate whether that particular user is presently accessing the data unit and/or editing the content in her or his section of the shared data unit. For instance, the graphical representation may be green to indicate presence. Or, the graphical representation may be faded to indicate non-presence or that the user is off-line.

Furthermore, the user interface presents a menu 204 that provides access to different options (e.g., features) usable to edit content and/or perform other functions with respect to the content (e.g., different ink colors for marking, an eraser, a brush, a ruler, undo inking, repeat inking, add an image, search for content, snap a photo, provide a reaction, etc.). One of the accessible menu options includes a get attention feature 206, a user selection of which is shown in FIG. 2A using a cursor element.

Figure 2B:
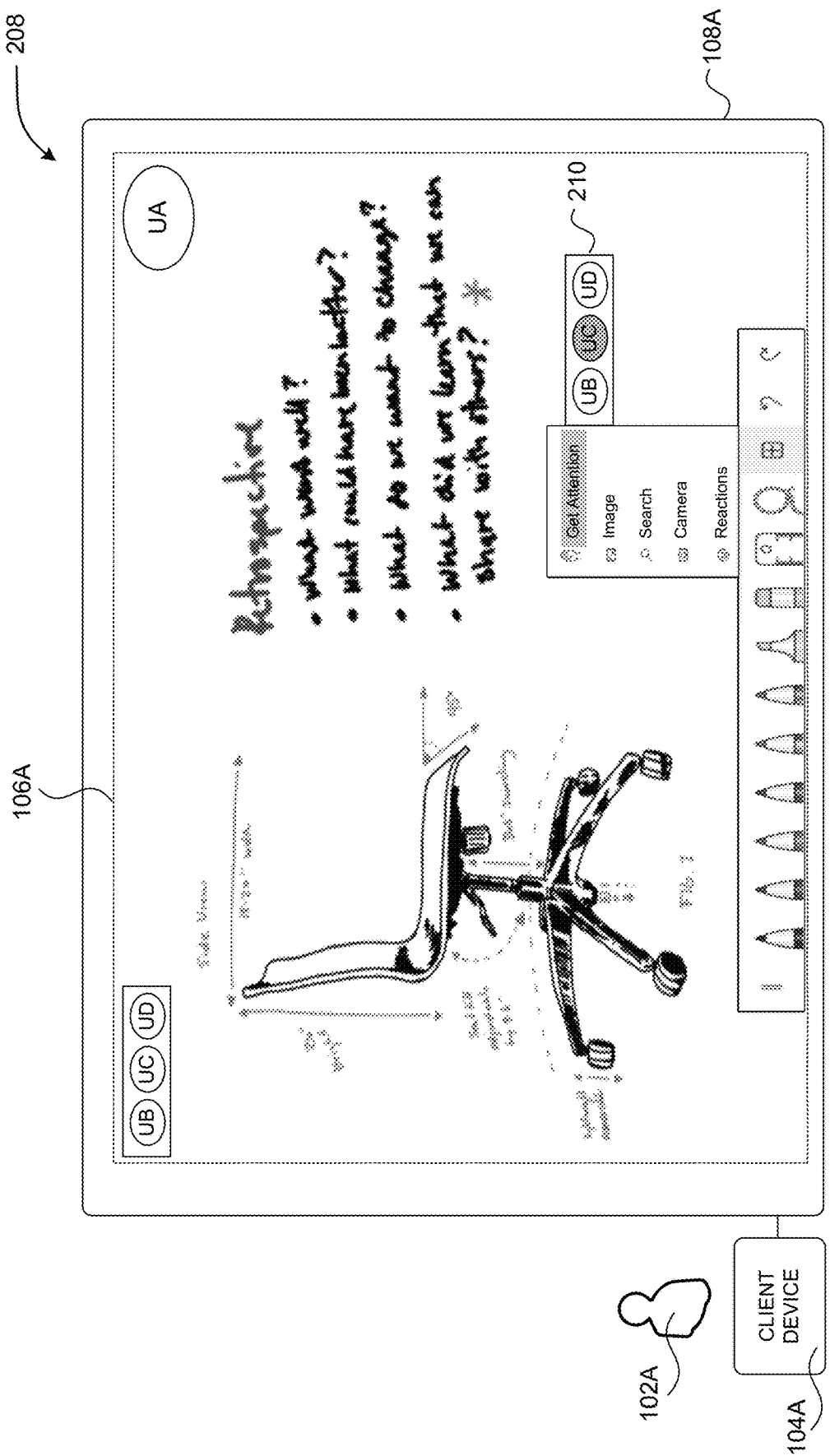
FIG. 2B illustrates an example of how a user can select specific users to which the request to view content is to be sent.

Moving to the user interface 208 in FIG. 2B, after selecting the get attention feature 206 in FIG. 2A, the user may be presented with an option 210 to select specific users to which the request to view content is to be sent. In the example of FIG. 2B, the user selects user 102C or "UC". The user can select any number of users to request attention from, including all the users. In some examples, a default request sends the requests to all the users participating in the multi-user sharing session.

FIG. 2C shows a user interface 212 in which a user can identify a portion of the content in her or his section for other users to focus on. For example, the user 102A can use a tool 214 associated with the get attention feature 206 to alter the visual appearance of the portion of the content 216 (e.g., highlight, change a color, etc.). In the example of FIG. 2C, the user 102A has drawn a rectangle around the portion of the content 216 in order to highlight content which the user 102A wants other users to focus on. Consequently, when the content is displayed to the other users, the portion of content identified by the user is graphically distinguished from other portions of the content. In this way, the other users know to focus a review on the identified portion of content.

Figure 2D:
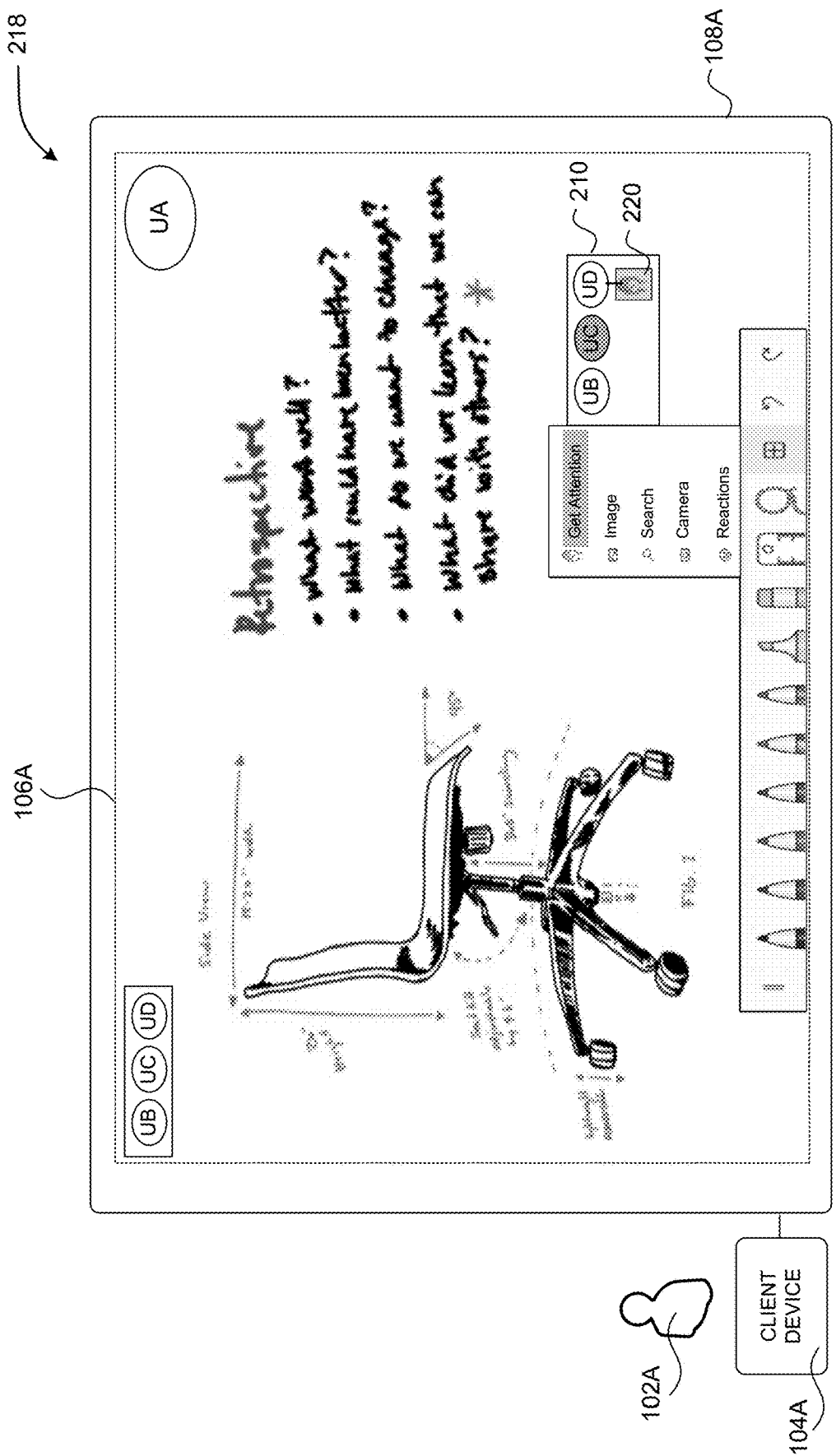
FIG. 2D illustrates an example of how a user can determine whether another user editing the same content as the user has previously called others to view the content.

FIG. 2D shows a user interface 218 that enables a user to determine whether another user editing the same content as the user has previously called others to view the content. In the example of FIG. 2D, user 102A and another user are editing the same content in the same section or an overlapping section of a data unit. Furthermore, the other user may have already requested that some or all of the users that have access to the shared data provide attention to the displayed content that multiple users are editing. Accordingly, when user 102A wants to identify users to provide attention, the user interface 218 can be configured to inform user 102A that a particular user has already been requested to provide attention. For instance, as shown by element 220 which associates a raised hand with the representation for user "UD" (e.g., user 102D), user 102A is notified that the attention of user 102D has already been requested by another user editing the same content as user 102A. In this way, user 102A is aware that other people are requesting attention for this content and/or this section.

Figure 3A:
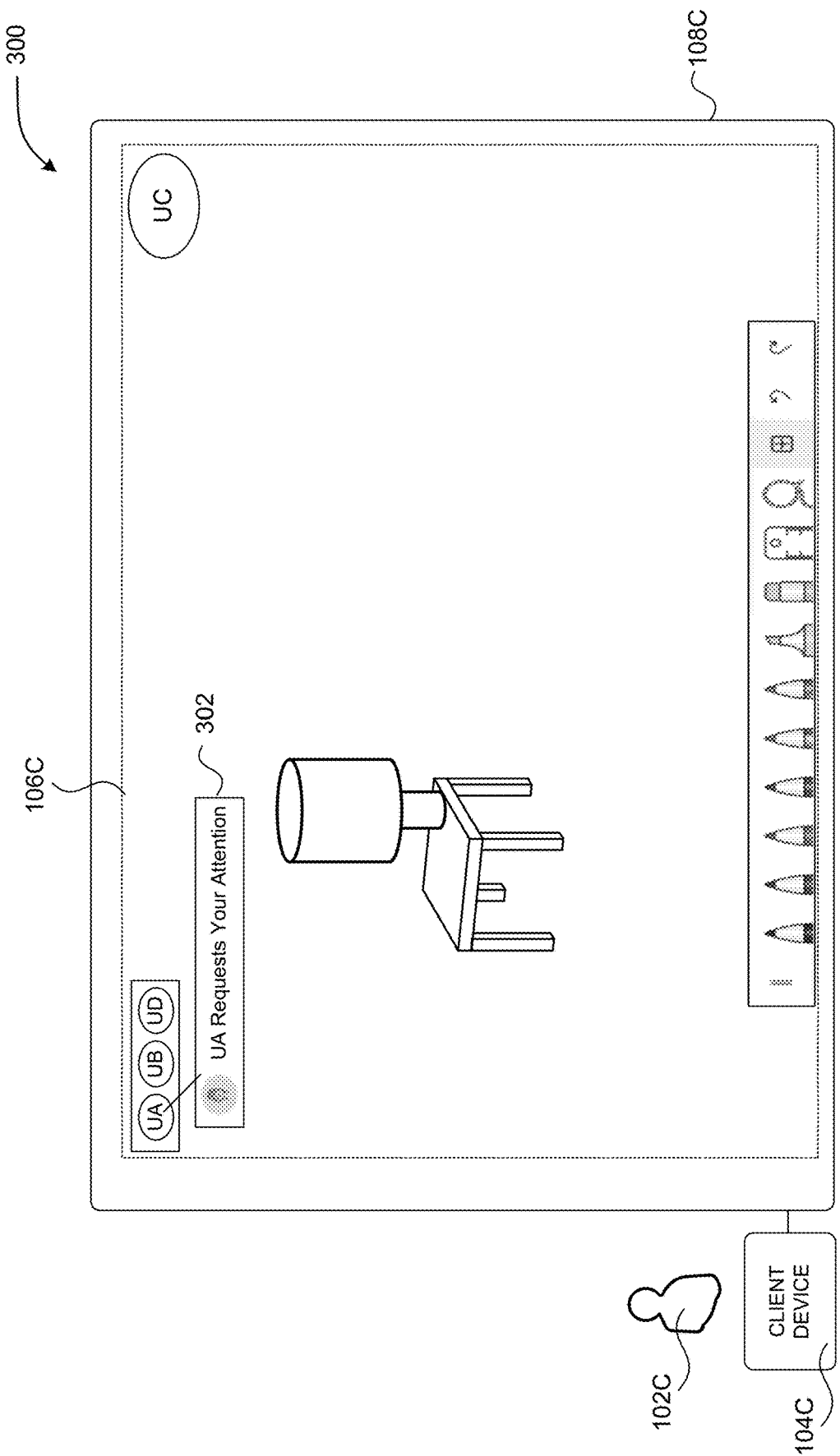
FIG. 3A illustrates an example user interface that displays a user interface element generated to notify a user that she or he is a user that has been requested to view the content being edited by another user.

Once the get attention feature 206 is activated, the client computing device 104A can send the request to the server computer 112 and/or the other client computing devices of those users which the user 102A wants to view the content. FIG. 3A illustrates a user interface 300 that displays a user interface element 302 generated by the server computer 112 and/or client computing device 104C to notify user 102C that she or he is a user that has been requested to view the content being edited by user 102A (e.g., provide attention to the content being edited by user 102A).

The user interface element 302 is displayed while user 102C is editing her or his own content 106C on the digital canvas (e.g., a table with a lamp). As shown, the user interface element 302 is graphically, and visually, associated with the representation of user 102A or ("UA"). This association reveals to user 102C that user 102A is the user requesting attention (not user 102B or user 102D).

Figure 3B:
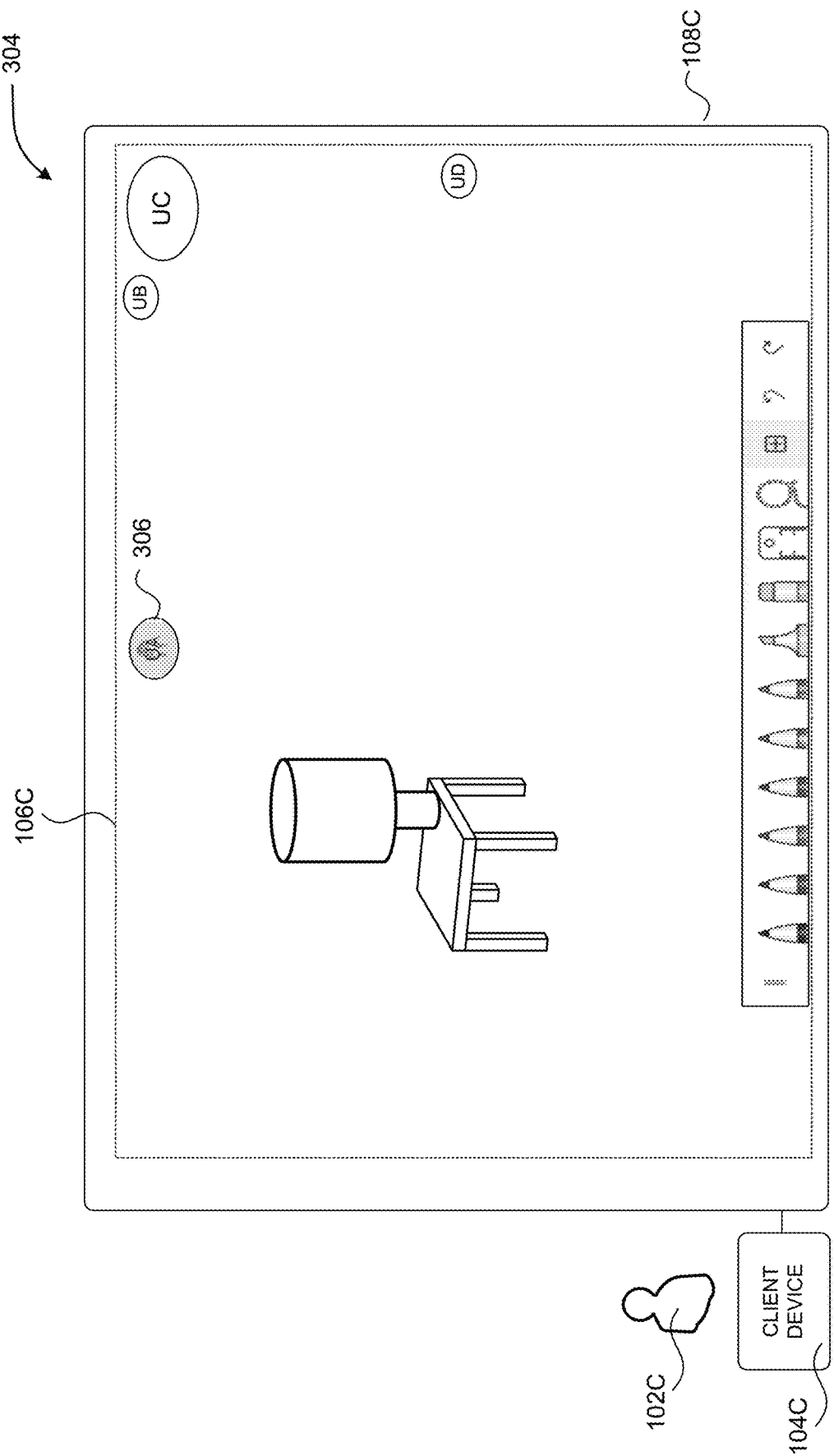
FIG. 3B illustrates another example user interface that displays a user interface element generated to notify a user that she or he is a user that has been requested to view the content being edited by another user.

FIG. 3B illustrates another user interface 304 that displays a user interface element 306 generated by the server computer 112 and/or client computing device 104C to notify user 102C that she or he is a user that has been requested to view the content being edited by user 102A. In this example, the graphical representation of user 102A ("UA") is altered in a way so as to indicate, to user 102C, that user 102A is requesting attention, and the altered graphical representation comprises the user interface element 306. In the example shown, an "attention requested" icon (e.g., an icon of a raised hand) is displayed as a partially transparent overlay on the graphical representation to indicate that attention is requested. In other examples, the graphical representation can flash, change colors, scale to a larger or smaller size, etc.

In FIG. 3B, the graphical representations of the users are positioned to reflect a layout location of currently displayed content 106C contained in a currently displayed section relative to a layout location of content being edited by the represented user in another section, as described above with respect to FIG. 1C.

Figure 4:
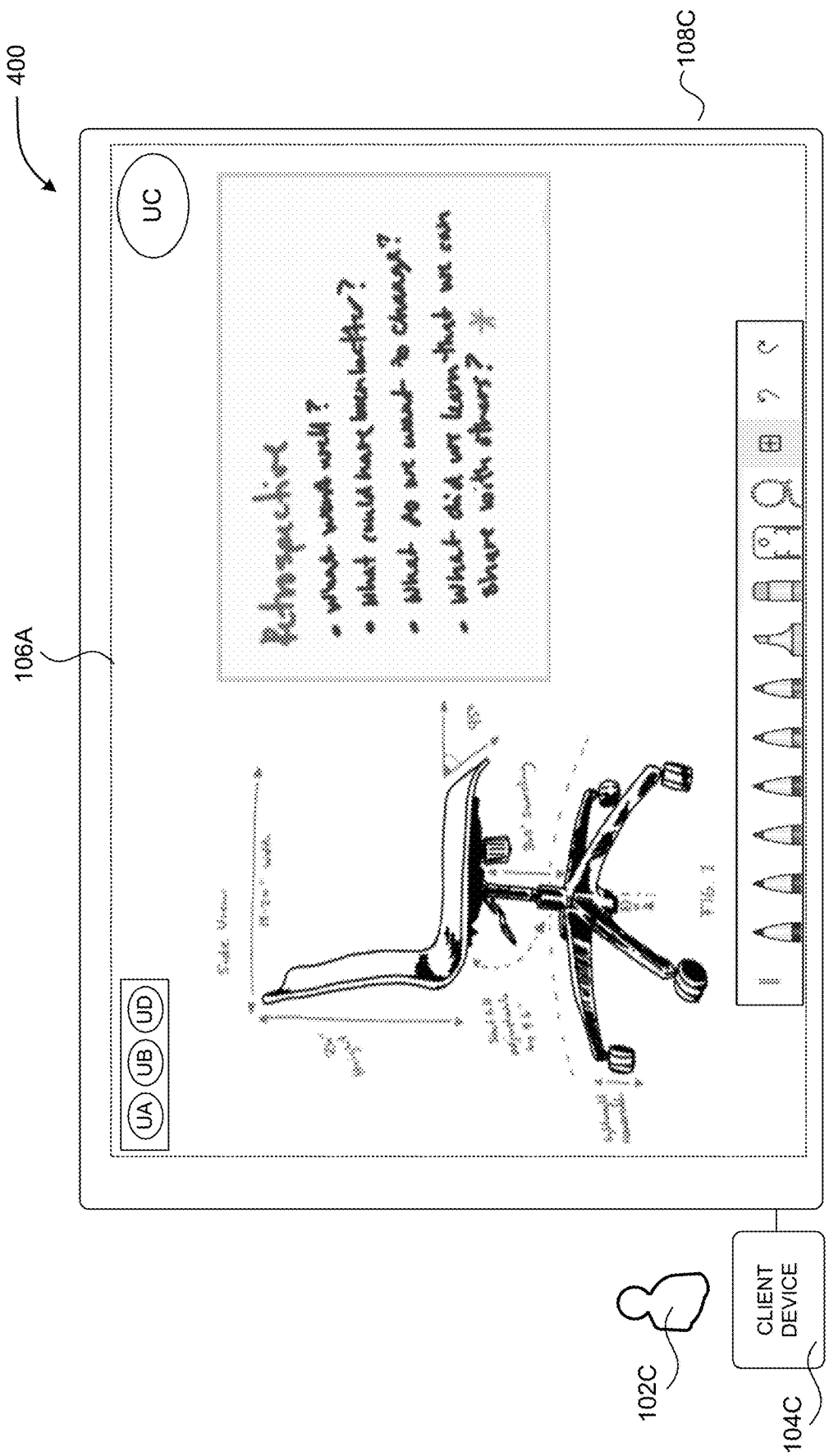
FIG. 4 illustrates an example user interface that is displayed after a user selects a user interface element to switch from currently displayed content to content for which the user has been requested to view.

FIG. 4 illustrates an example user interface 400 that is displayed after user 102C selects one of the user interface elements 302, 306 in FIGS. 3A and 3B. Accordingly, the view of the digital canvas for user 102C is switched from the currently displayed content 106C in FIGS. 3A and 3B (e.g., the table and the lamp being edited by user 102C) to the content 106A for which the view request was sent (e.g., a chair and the written questions being edited by user 102A).

In various examples, a view of the currently displayed content 106C is changed to a view of the content 106A requested to be viewed (e.g., the display jumps from one section of the shared data unit to another). In other examples, selection of a user interface element enables scrolling from one section in the digital canvas to another section in the digital canvas in at least one of a horizontal direction or a vertical direction. This enables user 102C to briefly view content that may exist between the two sections. The viewing of intermediate content may be useful in understanding the context of the digital canvas or a manner in which different sections of the digital canvas are organized (e.g., laid out) based on type(s) of content being edited and/or particular users editing the content.

Figure 5:
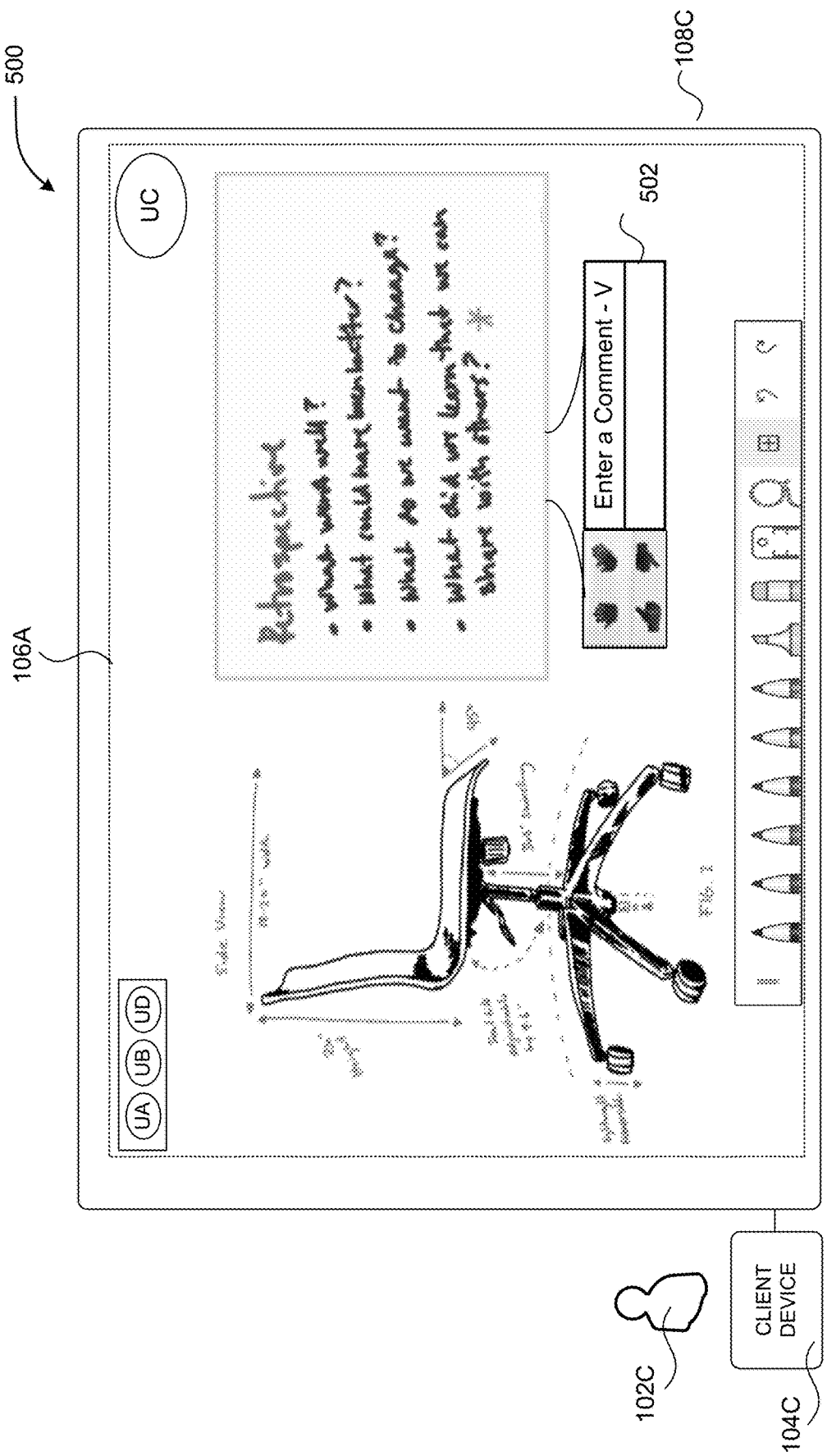
FIG. 5 illustrates an example user interface that enables a reviewer to provide feedback with respect to the content for which they have been requested to view.

FIG. 5 illustrates an example user interface 500 that enables a reviewer (e.g., user 102C) to provide feedback with respect to the content 106A for which she or he has been requested to view (e.g., provide attention). As shown, implementation of the get attention feature 206 may cause a feedback menu 502 to be displayed. The feedback menu 502 can be graphically associated (e.g., graphically connected) to the content the user wants a reviewer to focus on. Moreover, the feedback menu 502 allows user 102C to quickly provide a reaction (e.g., thumbs up, thumbs down, clap, an emoji, etc.) and/or submit a comment on the reviewed content 106A.

Figure 6A:
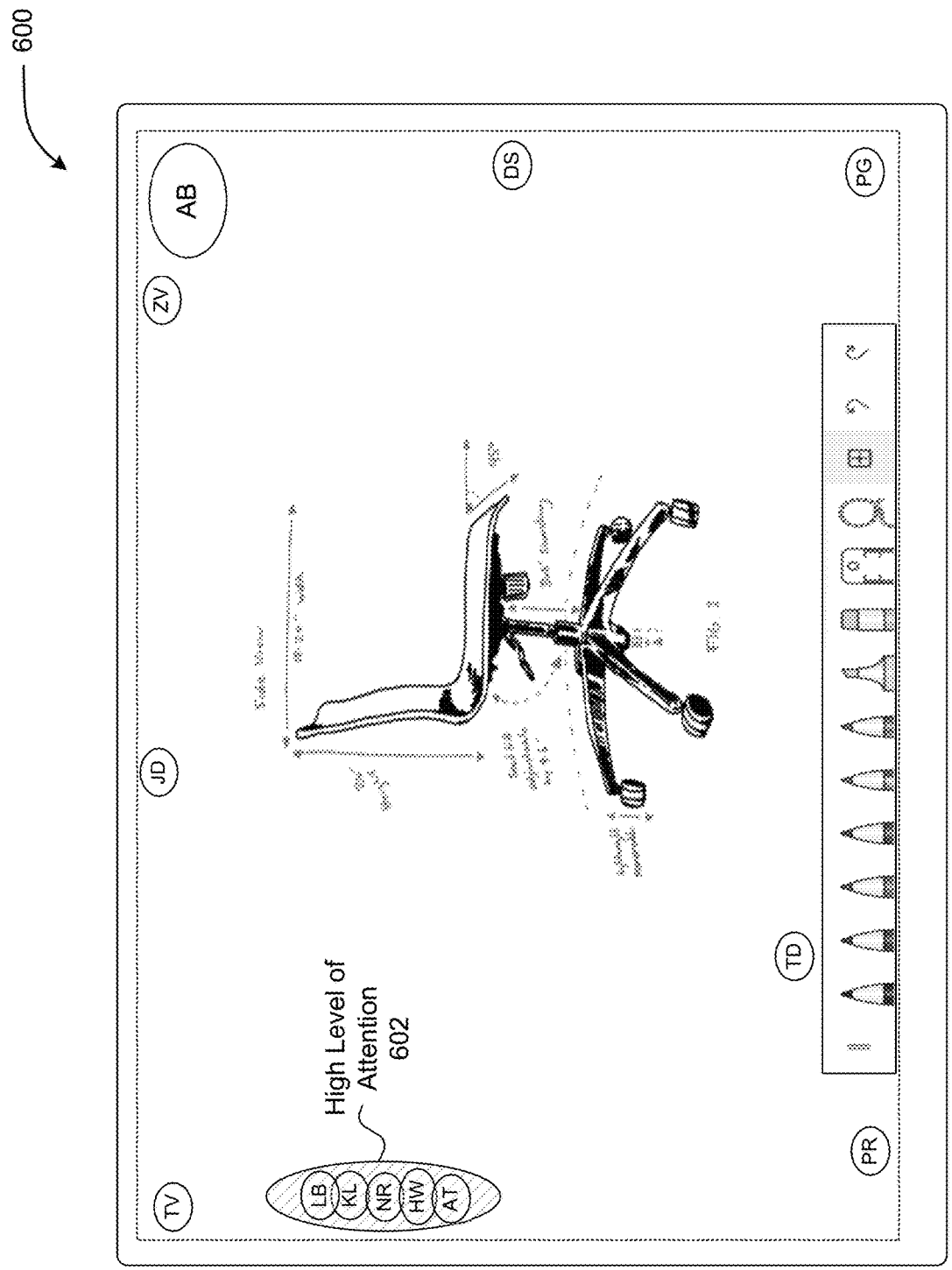
FIG. 6A illustrates an example user interface that visually notifies a user of a client device of a section of shared data that currently is receiving a high level of attention (e.g., a large number of users are currently viewing content in a "hot" or "popular" section of a shared data unit).

FIG. 6A illustrates an example user interface 600 that visually notifies a user of a client device of a section of shared data that currently is receiving a high level of attention (e.g., a large number of users are currently viewing content in a "hot" or "popular" section of a shared data unit). In this example, graphical representations of users that have access to the shared data unit (e.g., a digital canvas) are dispersed around the edge of the user interface 600 in order to identify the users, their presence or lack thereof, and/or the location of the different content being edited relative to the content currently displayed (e.g., a chair). As shown in FIG. 6A, a cluster of user representations (e.g., user "LB", user "KL", user "NR", user "HW", user "AT") are displayed close to one another. This indicates that each of the users are currently viewing content in the same section and/or overlapping sections. Accordingly, the system can provide a user interface element (e.g., a graphical bubble that groups the clustered users) to indicate that a particular section and/or particular content is currently receiving a high level of attention. This indication can be activated based on a threshold number of users that are viewing the same content and/or the same section. For example, the system can monitor for a predetermined percentage of online users switching their display screens to view the same content and/or the same section (e.g., 30% of users that are online are currently viewing the same content and/or the same section).

Figure 6B:
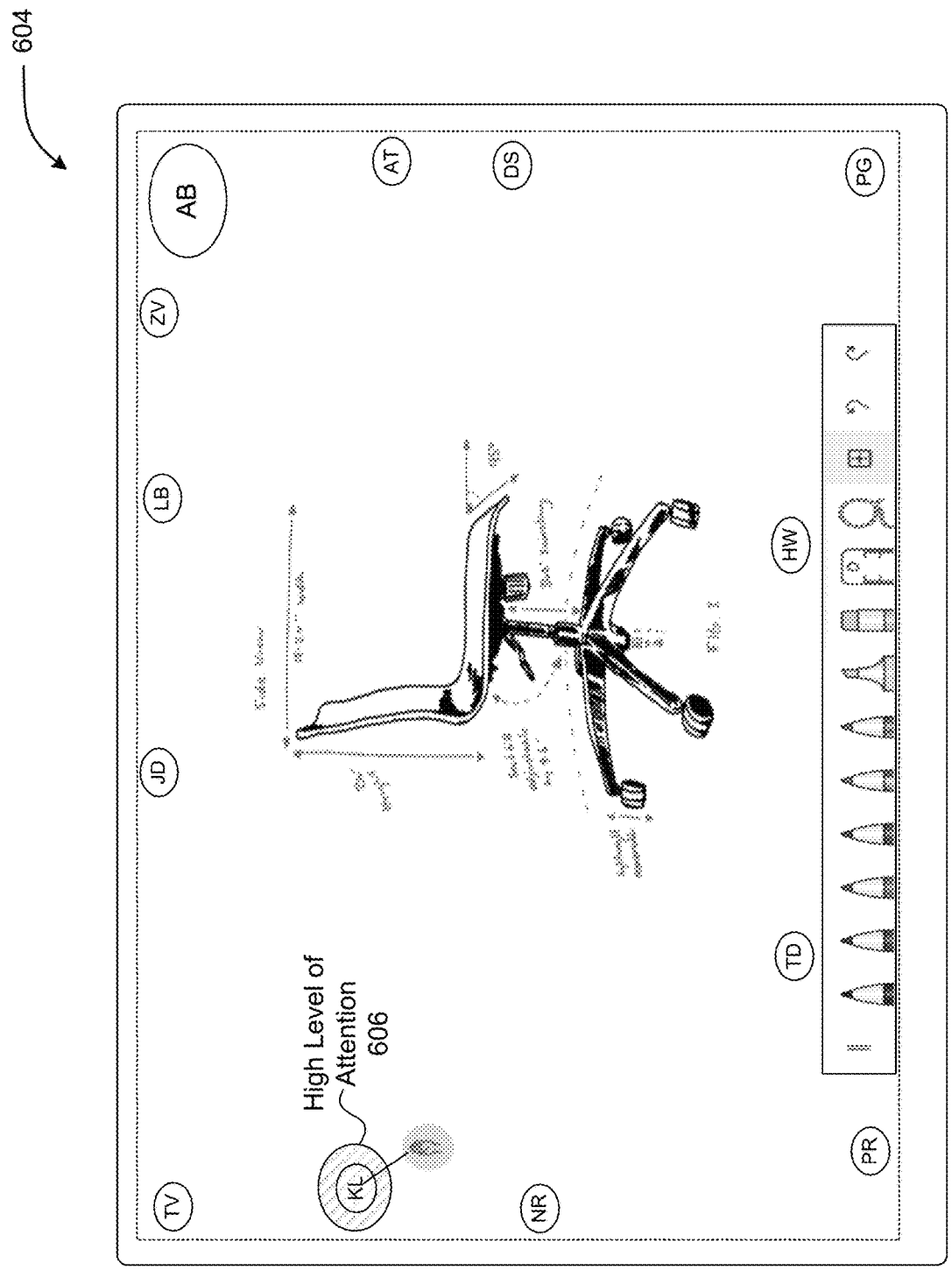
FIG. 6B illustrates an example user interface that visually notifies a user of a client device of a section of shared data that has received a high level of attention (e.g., a large number of users have recently switched to view content in a "hot" or "popular" section of a shared data unit).

FIG. 6B illustrates an example user interface 604 that visually notifies a user of a section of a shared data unit that has received a high level of attention (e.g., a large number of users have recently switched to view content in a "hot" or "popular" section of a shared data unit). Again, in this example, graphical representations of users that have access to the shared data unit (e.g., a digital canvas) are dispersed around the edge of the user interface 604 in order to identify the users, their presence or lack thereof, and/or the location of the different content being edited relative to the content currently displayed.

In this example, the visual appearance of one of the graphical representations (e.g., "KL") is altered to indicate that the content and/or the section currently being worked on by "KL" has recently received, a high level of attention 606. Similar to the discussion above, an altered visual appearance can include flashing, a change in colors, a change in fill pattern, a change in size, etc.

To determine whether a high level of attention has been reached in this example, the system may track the number of users that have viewed the content and/or a particular section over a time period (e.g., the most recent ten minutes, the most recent thirty minutes, the most recent day, the most recent week, etc.) and compare the number of users to a threshold number. If the number exceeds the threshold, then the content and/or the section qualifies as having received a high level of attention. In some instances, the threshold can be established based on a predetermined percentage of a total number of users that have access to the shared data unit (e.g., 10%, 20%, 30%, 40%, 50%, etc.).

Figure 7:
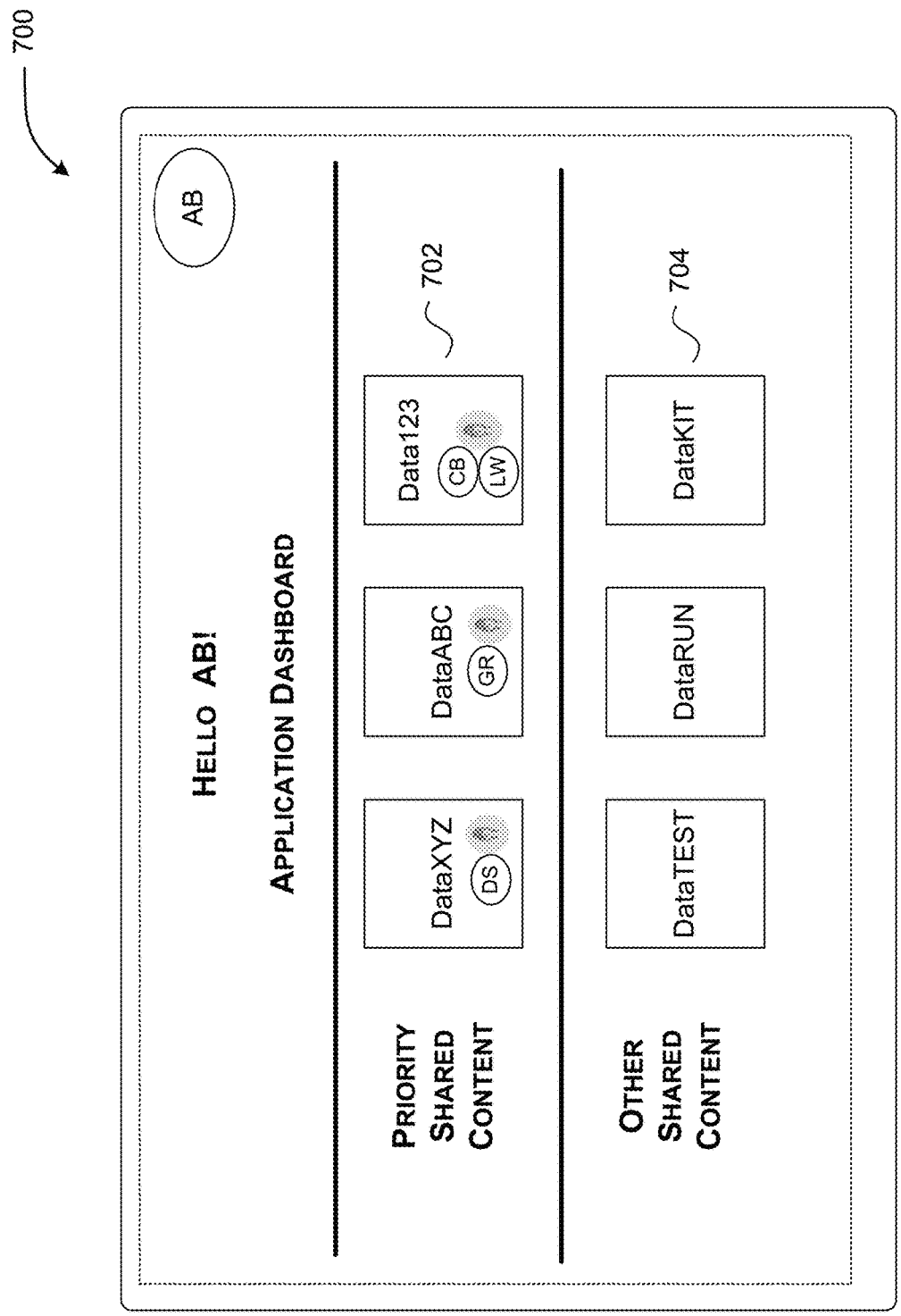
FIG. 7 illustrates an example user interface that contains a dashboard of shared data to which a user has access.

FIG. 7 illustrates an example user interface 700 that contains a dashboard of shared data units to which a user has access. As shown, the user interface 700 can separate shared data units for which attention is requested from a user from other shared data units. That is, a first section 702 may prioritize shared data units for which a user (e.g., "AB") is being requested to review content, and a second section 704 may contain data units with content for which the user (e.g., "AB") is not being requested to review content. As shown via the graphical elements on the data units, user "DS" is requesting that user "AB" review content in "DataXYZ", user "GR" is requesting that user "AB" review content in "DataABC", and users "CB" and "LW" are requesting that user "AB" review content in "Data123". Accordingly, the dashboard can provide a quick snapshot of how many people are requesting the attention of "AB", as well as a number of data units that need attention.

In various examples, the notification (e.g., the user interface element) indicating that a user's attention has been requested is configured to persist on a display screen for a predetermined period of time (e.g., thirty seconds, one minute, two minutes, five minutes, one day, etc.). Upon expiration of the predetermined period of time, the notification can be dismissed so that the user is no longer being notified of the request. Furthermore, the system may enable the user requesting the attention to set the period of time for which the notification is to persist before being dismissed. For instance, a user may define that a user interface element requesting attention be displayed for five minutes. After that five minutes, the user requesting the attention wants to continue editing the content by incorporating the feedback provided by those that reviewed the content. Consequently, any feedback received after five minutes may no longer be as effective. In additional or alternative examples, the user requested to provide attention can be presented with an option to manually dismiss or ignore the notification if the user thinks a review of the content is not important.

In some configurations, a request for attention can be attached to an object (e.g., a diagram or text drawn on a section of a whiteboard). Thus, if the object is deleted, the request for attention is terminated. Moreover, if the object is moved from one section of a whiteboard to another section of the whiteboard, then the request for attention moves with the object (e.g., a user interface element can be updated to indicate a location of an object to be reviewed). Even further, the request for attention can be associated with a state of an object, where the state of an object is associated with a timestamp. Accordingly, when a reviewer selects a user interface element to view content, based on a request for attention, the system can display the object in its state at the time attention is requested. In some instances, the system can also display the object in its current state so that the reviewer can compare the state of the object at a time attention is requested to a current state of the object at a time the reviewer chooses to review the object (e.g., the reviewer can compare the two states of the object to determine edits that occur between when attention is requested and when attention is provided).

Figure 8:
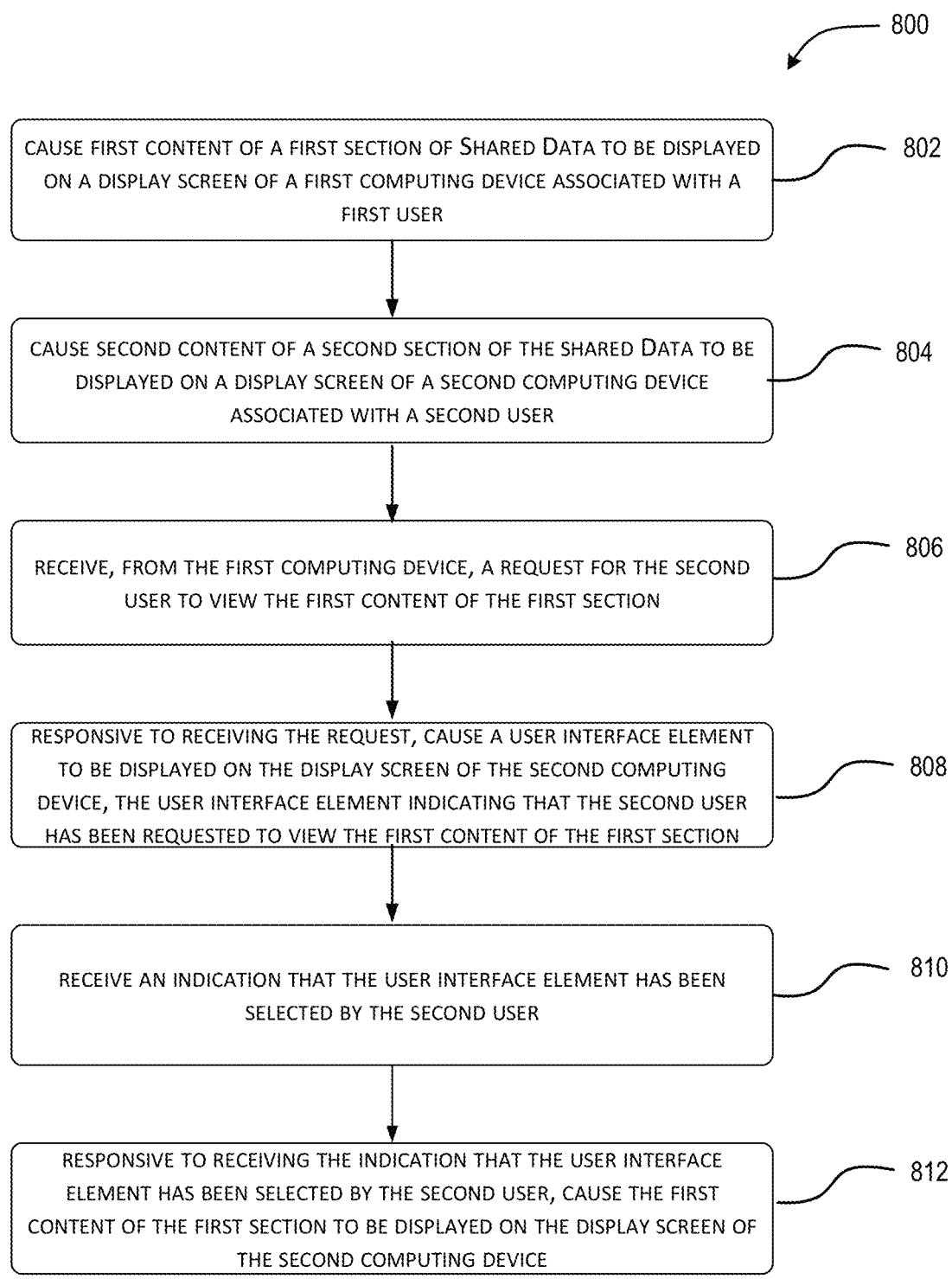
FIG. 8 is a flow diagram showing aspects of a routine for calling other users' attention to content.

FIG. 8 is a flow diagram illustrating a routine 800 for enabling aspects of the present disclosure. In various examples, operations of the routine 800 can be performed by the server computer 112 and/or a client computing device. It should be appreciated that the logical operations described herein with regard to FIG. 8, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

For example, the operations of the routine 800 can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustration may refer to the components of the Figures, it can be appreciated that the operations of the routine 800 may be also implemented in many other ways. For example, the routine 800 may be implemented, at least in part, by a processor of another remote computer, processor or circuit. In addition, one or more of the operations of the routine 800 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 8, the routine 800 begins at operation 802 where first content of a first section of a shared data unit is displayed on a display screen of a first computing device associated with a first user. As discussed above, a multi-user sharing session might, for example, be implemented as a digital whiteboard presenting whiteboard objects. At operation 804, second content of a second section of the shared data unit is displayed on a display screen of a second computing device associated with a second user.

The routine 800 proceeds to operation 806, where a request, for the second user to view the first content of the first section, is received from the first computing device. At operation 808, a user interface element is displayed on the display screen of the second computing device based on the reception of the request. The user interface element indicates that the second user has been requested to view the first content in the first section.

The routine then proceeds to operation 810 where an indication that the user interface element has been selected is received. Based on receipt of the indication, at operation 812, the first content of the first section is displayed on the display screen of the second computing device.

Figure 9:
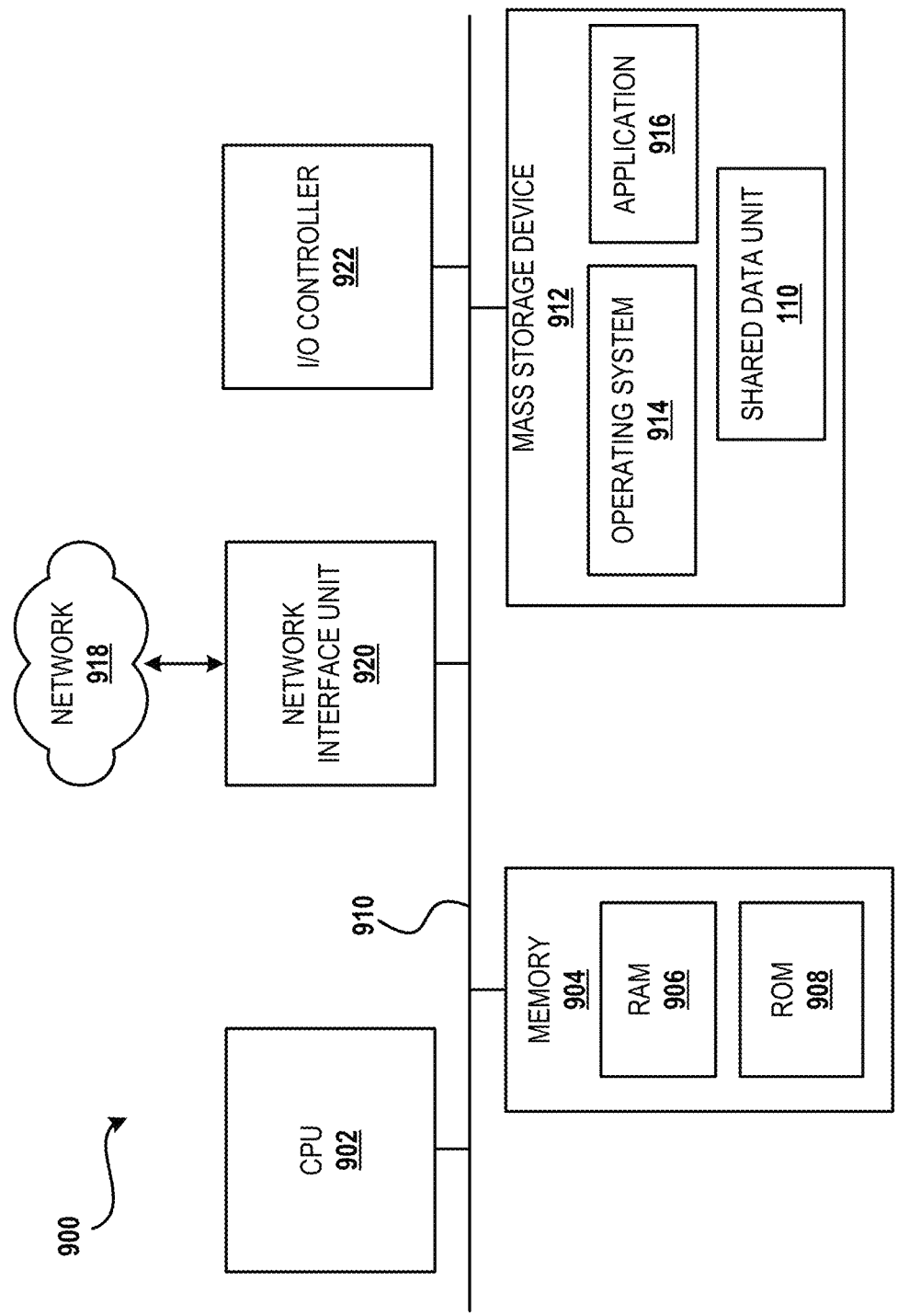
FIG. 9 is a computer architecture diagram illustrating an illustrative computer hardware and software architecture for a computing system capable of implementing aspects of the techniques and technologies presented herein.

FIG. 9 shows additional details of an example computer architecture 900 for a computer, such as the client computing devices 104 and the server computer 112 shown in FIGS. 1A-1C, capable of executing the program components described herein. Thus, the computer architecture 900 illustrated in FIG. 9 illustrates an architecture for a server computer, a mobile phone, a PDA, a smart phone, a desktop computer, a netbook computer, a tablet computer, and/or a laptop computer. The computer architecture 900 may be utilized to execute any aspects of the software components presented herein.

The computer architecture 900 illustrated in FIG. 9 includes a central processing unit 902 ("CPU"), a system memory 904, including a random access memory 906 ("RAM") and a read-only memory ("ROM") 908, and a system bus 910 that couples the memory 904 to the CPU 902. A basic input/output system containing the basic routines that help to transfer information between elements within the computer architecture 900, such as during startup, is stored in the ROM 908. The computer architecture 900 further includes a mass storage device 912 for storing an operating system 914, an application 916 such as a digital whiteboard application (e.g., with a feature to request attention), a shared data unit 110 containing content 106, and other data described herein.

The mass storage device 912 is connected to the CPU 902 through a mass storage controller (not shown) connected to the bus 910. The mass storage device 912 and its associated computer-readable media provide non-volatile storage for the computer architecture 900. Although the description of computer-readable media contained herein refers to a mass storage device, such as a solid-state drive, a hard disk or a CD-ROM drive, it should be appreciated by those skilled in the art that computer-readable media can be any available computer-readable storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer-readable storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD- DVD, BLU-RAY, or other optical storage, magnetic cassettes, magnetic tape, magnetic disk storage or other magnetic storage devices, or any other medium which can be used to store the desired information, and which can be accessed by the computer architecture 900. For purposes of the claims, the phrase "computer storage medium," "computer-readable storage medium" and variations thereof, does not include waves, signals, and/or other transitory and/or intangible communication media, per se.

According to various configurations, the computer architecture 900 may operate in a networked environment using logical connections to remote computers through the network 918. The computer architecture 900 may connect to the network 918 through a network interface unit 920 connected to the bus 910. The computer architecture 900 also may include an input/output controller 922 for receiving and processing input from a number of other devices, including a keyboard, mouse, touch, or electronic stylus or pen. Similarly, the input/output controller 922 may provide output to a display screen, a printer, or other type of output device.

It should be appreciated that the software components described herein may, when loaded into the CPU 902 and executed, transform the CPU 902 and the overall computer architecture 900 from a general-purpose computing system into a special-purpose computing system customized to facilitate the functionality presented herein. The CPU 902 may be constructed from any number of transistors or other discrete circuit elements, which may individually or collectively assume any number of states. More specifically, the CPU 902 may operate as a finite-state machine, in response to executable instructions contained within the software modules disclosed herein. These computer-executable instructions may transform the CPU 902 by specifying how the CPU 902 transitions between states, thereby transforming the transistors or other discrete hardware elements constituting the CPU 902.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 900 in order to store and execute the software components presented herein. It also should be appreciated that the computer architecture 900 may include other types of computing devices, including hand-held computers, embedded computer systems, personal digital assistants, and other types of computing devices known to those skilled in the art. It is also contemplated that the computer architecture 900 may not include all of the components shown in FIG. 9, may include other components that are not explicitly shown in FIG. 9, or may utilize an architecture completely different than that shown in FIG. 9.

FIG. 10 depicts an illustrative distributed computing environment 1000 capable of executing the software components described herein. Thus, the distributed computing environment 1000 illustrated in FIG. 10 can be utilized to execute any aspects of the software components presented herein.

According to various implementations, the distributed computing environment 1000 includes a computing environment 1002 operating on, in communication with, or as part of the network 1004. One or more client devices 1006A-1006N (hereinafter referred to collectively and/or generically as "clients 1006" and also referred to herein as computing devices 1006) can communicate with the computing environment 1002 via the network 1004.

In one illustrated configuration, the clients 1006 include a computing device 1006A such as a laptop computer, a desktop computer, or other computing device; a slate or tablet computing device ("tablet computing device") 1006B; a mobile computing device 1006C such as a mobile telephone, a smart phone, or other mobile computing device; a server computer 1006D; and/or other devices 1006N. It should be understood that any number of clients 1006 can communicate with the computing environment 1002.

In the illustrated configuration, the computing environment 1002 includes application servers 1008, data storage 1010, and one or more network interfaces 1012. According to various implementations, the functionality of the application servers 1008 can be provided by one or more server computers that are executing as part of, or in communication with, the network 1004. The application servers 1008 can host various services, virtual machines, portals, and/or other resources. In the illustrated configuration, the application servers 1008 host one or more virtual machines 1014 for hosting applications or other functionality. According to various implementations, the virtual machines 1014 host one or more applications and/or software modules for implementing aspects of the functionality disclosed herein. It should be understood that this configuration is illustrative and should not be construed as being limiting in any way. The application servers 1008 can also host or provide access to one or more portals, link pages, Web sites, and/or other information ("web portals") 1016.

According to various implementations, the application servers 1008 also include one or more mailbox services 1018 and one or more messaging services 1020. The mailbox services 1018 can include electronic mail ("email") services. The mailbox services 1018 also can include various personal information management ("PIM") and presence services including, but not limited to, calendar services, contact management services, collaboration services, and/or other services. The messaging services 1020 can include, but are not limited to, instant messaging services, chat services, forum services, and/or other communication services.

The application servers 1008 also may include one or more social networking services 1022. The social networking services 1022 can include various social networking services including, but not limited to, services for sharing or posting status updates, instant messages, links, photos, videos, and/or other information; services for commenting or displaying interest in articles, products, blogs, or other resources; and/or other services.

As shown in FIG. 10, the application servers 1008 also can host other services, applications, portals, and/or other resources ("other resources") 1024. The other resources 1024 can include, but are not limited to, workspace collaboration, document sharing, rendering or any other functionality. It thus can be appreciated that the computing environment 1002 can provide integration of the concepts and technologies disclosed herein with various mailbox, messaging, social networking, and/or other services or resources.

As mentioned above, the computing environment 1002 can include the data storage 1010. According to various implementations, the functionality of the data storage 1010 is provided by one or more databases operating on, or in communication with, the network 1004. The functionality of the data storage 1010 also can be provided by one or more server computers configured to host data for the computing environment 1002. The data storage 1010 can include, host, or provide one or more real or virtual datastores 1026A-1026N (hereinafter referred to collectively and/or generically as "datastores 1026"). The datastores 1026 are configured to host data used or created by the application servers 1008 and/or other data. Although not illustrated in FIG. 10, the datastores 1026 also can host or store web page documents, word documents, presentation documents, data structures, algorithms for execution by a recommendation engine, and/or other data utilized by any application program or another module. Aspects of the datastores 1026 may be associated with a service for storing data units such as files.

The computing environment 1002 can communicate with, or be accessed by, the network interfaces 1012. The network interfaces 1012 can include various types of network hardware and software for supporting communications between two or more computing devices including, but not limited to, the computing devices and the servers. It should be appreciated that the network interfaces 1012 also may be utilized to connect to other types of networks and/or computer systems.

It should be understood that the distributed computing environment 1000 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1000 provides the software functionality described herein as a service to the computing devices. It should also be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1000 to utilize the functionality described herein for providing the techniques disclosed herein, among other aspects. In one specific example, as summarized above, techniques described herein may be implemented, at least in part, by a web browser application, which works in conjunction with the application servers 1008 of FIG. 10.

The disclosure presented herein also encompasses the subject matter set forth in the following clauses.

Example Clause A, a system comprising: one or more processing units; and a computer-readable storage medium having computer-executable instructions encoded thereon to cause the one or more processing units to: cause first content of a first section of a shared data to be displayed on a display screen of a first computing device associated with a first user, wherein the shared data is accessible to a plurality of users in a multi-user sharing session; cause second content of a second section of the shared data to be displayed on a display screen of a second computing device associated with a second user, wherein the second content of the second section is different than the first content of the first section; receive, from the first computing device, a request for the second user to view the first section; responsive to receiving the request, cause a user interface element to be displayed on the display screen of the second computing device, the user interface element indicating that the second user has been requested to view the first section; receive an indication that the user interface element has been selected by the second user; and responsive to receiving the indication that the user interface element has been selected by the second user, cause the first content of the first section to be displayed on the display screen of the second computing device.

Example Clause B, the system of Example Clause A, wherein causing the first content of the first section to be displayed on the display screen of the second computing device comprises changing a view of the second content of the second section to a view of the first content of the first section.

Example Clause C, the system of Example Clause A, wherein causing the first content of the first section to be displayed on the display screen of the second computing device comprises scrolling from the second section to the first section in at least one of a horizontal direction or a vertical direction.

Example Clause D, the system of any one of Example Clause A through C, wherein the shared data comprises a digital whiteboard and the first section of the digital whiteboard comprises an off-screen section when the second section of the digital whiteboard is being displayed on the display screen of the second computing device.

Example Clause E, the system of any one of Example Clause A through D, wherein the user interface element displayed on the display screen of the second computing device is graphically associated with a graphical representation of the first user.

Example Clause F, the system of Example Clause E, wherein the user interface element further indicates that the first user is presently editing the first content in the first section of the shared data.

Example Clause G, the system of any one of Example Clause A through F, wherein: the user interface element displayed on the display screen of the second computing device comprises a graphical representation of the first user; and the computer-executable instructions further cause the one or more processing units to alter a visual appearance of the graphical representation of the first user to indicate that the second user has been requested to view the first section of the shared data.

Example Clause H, the system of any one of Example Clause A through G, wherein the computer-executable instructions further cause the one or more processing units to: determine a layout location of the first section relative to a layout location of the second section; and cause the user interface element to be displayed at a position on the display screen of the second computing device that represents the layout location of the first section relative to the layout location of the second section.

Example Clause I, the system of any one of Example Clause A through H, wherein the computer-executable instructions further cause the one or more processing units to graphically distinguish between a first portion of the first content displayed on the display screen of the second computing device and a second portion of the first content displayed on the display screen of the second computing device, wherein the first portion of the first content has been selected by the first user for review by the second user.

Example Clause J, the system of Example Clause I, wherein the first portion of the first content is graphically distinguished from the second portion of the first content via highlighting.

Example Clause K, a method comprising: causing first content of a shared data to be displayed on a display screen of a first computing device associated with a first user, wherein the shared data is accessible to a plurality of users in a multi-user sharing session; causing second content of the shared data to be displayed on a display screen of a second computing device associated with a second user, wherein the second content is different than the first content; receiving, from the first computing device, a request for the second user to view the first content; responsive to receiving the request, causing a user interface element to be displayed on the display screen of the second computing device, the user interface element indicating that the second user has been requested to view the first content; receiving an indication that the user interface element has been selected by the second user; and responsive to receiving the indication that the user interface element has been selected by the second user, causing the first content to be displayed on the display screen of the second computing device.

Example Clause L, the method of Example Clause K, wherein causing the first content to be displayed on the display screen of the second computing device comprises changing a view of the second content to a view of the first content.

Example Clause M, the method of Example Clause K or Example Clause L, wherein the shared data comprises a digital whiteboard and the first content comprises off-screen content when the second content is being displayed on the display screen of the second computing device.

Example Clause N, the method of any one of Example Clauses K through M, wherein the user interface element displayed on the display screen of the second computing device is graphically associated with a graphical representation of the first user.

Example Clause O, the method of any one of Example Clauses K through N, wherein: the user interface element displayed on the display screen of the second computing device comprises a graphical representation of the first user; and the method further comprises altering a visual appearance of the graphical representation of the first user to indicate that the second user has been requested to view the first content of the shared data.

Example Clause P, the method of any one of Example Clauses K through O, further comprising: determining a layout location of the first content relative to a layout location of the second content in the shared data; and causing the user interface element to be displayed at a position on the display screen of the second computing device that represents the layout location of the first content relative to the layout location of the second content in the shared data.

Example Clause Q, a computing device comprising: one or more processing units; and a computer-readable storage medium having computer-executable instructions encoded thereon to cause the one or more processing units to: display content of a shared data on a display screen, wherein the shared data is accessible to a plurality of users in a multi-user sharing session and the content is being edited by a user associated with the computing device; display a menu option that enables the user to call attention to at least a portion of the content; and based upon a selection of the menu option, send an instruction to request that another user, of the plurality of users in the multi-sharing session, attend to the portion of the content.

Example Clause R, the computing device of Example Clause Q, wherein attending to the portion of the content comprises replacing other content currently being displayed via another computing device associated with the other user with the content being edited by the user associated with the computing device.

Example Clause S, the computing device of Example Clause Q or Example Clause R, wherein sending the instruction to request that the other user attend to the portion of the content causes a user interface element to be displayed via another computing device associated with the other user, the user interface element indicating that the user has requested that the other user view the content.

Example Clause T, the computing device of any one of Example Clauses Q through S, wherein the computer-executable instructions further cause the one or more processing units to display a user interface element associated with each of the plurality of users, a selection of the user interface element identifying a corresponding user as the one to attend to the content.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different users, two different virtual machines, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

The invention claimed is:

1. A system comprising:
one or more processors; and
a computer-readable storage medium having computer-executable instructions encoded thereon to cause the one or more processors to:
cause first content of a first section of a digital whiteboard to be displayed on a display screen of a first computing device associated with a first user, wherein the digital whiteboard is accessible to a plurality of users in a multi-user sharing session;
cause second content of a second section of the digital whiteboard to be displayed on a display screen of a second computing device associated with a second user, wherein the second content of the second section is different than the first content of the first section and the first content of the first section comprises off-screen content when the second content of the second section is being displayed on the display screen of the second computing device;
determine a direction associated with a layout location of the first section relative to a layout location of the second section within the digital whiteboard, wherein the direction includes both a vertical component and a horizontal component;
cause a user interface element that represents the first user to be displayed on the display screen of the second computing device, wherein the user interface element is caused to be displayed at a position on the display screen of the second computing device that represents the layout location of the first section relative to the layout location of the second section;
receive, from the first computing device, a request for the second user to view the first section, the request being received based on a selection, by the first user, identifying the second user from the plurality of users in the multi-user sharing session;
alter a visual appearance of the user interface element that represents the first user, based at least in part on the request, to indicate that the second user has been selected by the first user to view the first section of the shared data;
receive an indication that the user interface element has been selected by the second user; and
responsive to receiving the indication that the user interface element has been selected by the second user, cause the first content of the first section to be displayed on the display screen of the second computing device by scrolling from the second section to the first section along the direction, wherein the scrolling displays intermediate content located on the digital whiteboard between the second section and the first section.

2. The system of claim 1, wherein the user interface element further indicates that the first user is presently editing the first content in the first section of the digital whiteboard.

3. The system of claim 1, wherein the computer-executable instructions further cause the one or more processors to graphically distinguish between a first portion of the first content displayed on the display screen of the second computing device and a second portion of the first content displayed on the display screen of the second computing device, wherein the first portion of the first content has been selected by the first user for review by the second user.

4. The system of claim 3, wherein the first portion of the first content is graphically distinguished from the second portion of the first content via highlighting.

5. The system of claim 1, wherein altering the visual appearance of the user interface element comprises at least one of adding a predefined icon to the user interface element, a change in colors of the user interface element, a change in size of the user interface element, or a flashing of the user interface element.

6. A method comprising:
causing first content of a digital whiteboard to be displayed on a display screen of a first computing device associated with a first user, wherein the digital whiteboard is accessible to a plurality of users in a multi-user sharing session;
causing second content of the digital whiteboard to be displayed on a display screen of a second computing device associated with a second user, wherein the second content is different than the first content and the first content of the first section comprises off-screen content when the second content of the second section is being displayed on the display screen of the second computing device;
determining a direction associated with a layout location of the first section relative to a layout location of the second section within the digital whiteboard, wherein the direction includes both a vertical component and a horizontal component;
causing a user interface element that represents the first user to be displayed on the display screen of the second computing device, wherein the user interface element is caused to be displayed at a position on the display screen of the second computing device that represents the layout location of the first section relative to the layout location of the second section;
receiving, from the first computing device, a request for the second user to view the first content, the request being received based on a selection, by the first user, identifying the second user from the plurality of users in the multi-user sharing session;
altering a visual appearance of the user interface element that represents the first user, based at least in part on the request, to indicate that the second user has been selected by the first user to view the first content;
receiving an indication that the user interface element has been selected by the second user; and
responsive to receiving the indication that the user interface element has been selected by the second user, causing the first content to be displayed on the display screen of the second computing device by scrolling from the second section to the first section along the direction, wherein the scrolling displays intermediate content located on the digital whiteboard between the second section and the first section.

7. The method of claim 6, wherein altering the visual appearance of the user interface element comprises at least one of adding a predefined icon to the user interface element, a change in colors of the user interface element, a change in size of the user interface element, or a flashing of the user interface element.

8. The method of claim 6, wherein the user interface element further indicates that the first user is presently editing the first content in the first section of the digital whiteboard.

9. The method of claim 6, further comprising graphically distinguishing between a first portion of the first content displayed on the display screen of the second computing device and a second portion of the first content displayed on the display screen of the second computing device, wherein the first portion of the first content has been selected by the first user for review by the second user.

10. The method of claim 9, wherein the first portion of the first content is graphically distinguished from the second portion of the first content via highlighting.

* * * * *